(12) United States Patent
Frederick et al.

(10) Patent No.: US 8,661,394 B1
(45) Date of Patent: Feb. 25, 2014

(54) DEPTH-OPTIMAL MAPPING OF LOGIC CHAINS IN RECONFIGURABLE FABRICS

(75) Inventors: Michael T. Frederick, Colorado Springs, CO (US); Arun K. Somani, Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 1209 days.

(21) Appl. No.: 12/236,781

(22) Filed: Sep. 24, 2008

(51) Int. Cl.
 *G06F 17/50* (2006.01)
(52) U.S. Cl.
 USPC .......................................... 716/126; 716/104
(58) Field of Classification Search
 USPC .................................................. 716/104, 126
 See application file for complete search history.

(56) References Cited

U.S. PATENT DOCUMENTS

| | | | |
|---|---|---|---|
| 3,230,355 A | 1/1966 | Chu | |
| 3,296,426 A | 1/1967 | Ball | |
| 3,313,926 A | 4/1967 | Minnick | |
| 3,400,379 A | 9/1968 | Harman | |
| 3,566,153 A | 2/1971 | Spencer, Jr. | |
| 3,702,985 A | 11/1972 | Proebsting | |
| 3,731,073 A | 5/1973 | Moylan | |
| 3,803,587 A | 4/1974 | Mead | |
| 3,816,725 A | 6/1974 | Greer | |
| 3,818,203 A | 6/1974 | Perlowski et al. | |
| 3,849,638 A | 11/1974 | Greer | |
| 3,912,914 A | 10/1975 | Moylan | |
| 3,936,812 A | 2/1976 | Cox et al. | |
| 3,974,366 A | 8/1976 | Hebenstreit | |
| 3,975,623 A | 8/1976 | Weinberger | |
| 3,983,538 A | 9/1976 | Jones | |
| 3,987,286 A | 10/1976 | Muehldorf | |
| 3,987,287 A | 10/1976 | Cox et al. | |
| 4,029,970 A | 6/1977 | Hong et al. | |
| 4,032,894 A | 6/1977 | Williams | |
| 4,034,356 A | 7/1977 | Howley et al. | |
| 4,037,089 A | 7/1977 | Horninger | |
| 4,041,459 A | 8/1977 | Horninger | |
| 4,051,358 A | 9/1977 | Schwartz | |
| 4,056,807 A | 11/1977 | Thornber | |
| 4,124,899 A | 11/1978 | Birkner et al. | |
| 4,140,921 A | 2/1979 | Balasubramanian et al. | |
| 4,195,352 A | 3/1980 | Tu et al. | |

(Continued)

OTHER PUBLICATIONS

Cong, Jason, "FlowMap: An Optimal Technology Mapping Algorithm for Delay Optimization in Lookup-Table Based FPGA Designs", IEEE Transactions on Computer-Aided Design of Integrated Circuits and Systems, vol. 13, No. 1, Jan. 1994, pp. 1-12.

(Continued)

*Primary Examiner* — Thuan Do
(74) *Attorney, Agent, or Firm* — McKee, Voorhees & Sease, P.L.C.

(57) ABSTRACT

A method of creating logic chains in a Boolean network of a reconfigurable fabric is provided. The method includes creating a plurality of logic chains in the reconfigurable fabric. The plurality of logic chains include at least one arithmetic logic chain and at least one non-arithmetic logic chain. A method of creating logic chains in a Boolean network of a look-up table based FPGA includes: applying a labeling method by (a) finding a depth increasing node, (b) isolating the depth increasing node, and (c) finding minimum height cuts; mapping to generate a mapping solution using the minimum height cuts; applying a duplication method to implement an exclusivity constraint; and arranging connections in the look-up table based FPGA using the logic chains.

17 Claims, 12 Drawing Sheets

(56) References Cited

U.S. PATENT DOCUMENTS

| | | |
|---|---|---|
| 4,207,556 A | 6/1980 | Sugiyama et al. |
| 4,233,667 A | 11/1980 | Devine et al. |
| 4,237,542 A | 12/1980 | Cukier |
| 4,249,246 A | 2/1981 | Nanya et al. |
| 4,293,783 A | 10/1981 | Patil |
| 4,336,601 A | 6/1982 | Tanaka |
| 4,348,736 A | 9/1982 | Weinberger |
| 4,380,811 A | 4/1983 | Gotze et al. |
| 4,395,646 A | 7/1983 | Cases et al. |
| 4,399,516 A | 8/1983 | Blahut et al. |
| 4,409,499 A | 10/1983 | Zapisek et al. |
| 4,415,818 A | 11/1983 | Ogawa et al. |
| 4,429,238 A | 1/1984 | Harrison |
| 4,433,331 A | 2/1984 | Kollaritsch |
| 4,468,735 A | 8/1984 | Gotze et al. |
| 4,488,246 A | 12/1984 | Brice |
| 4,490,812 A | 12/1984 | Guterman |
| 4,495,590 A | 1/1985 | Mitchell, Jr. |
| 4,500,800 A | 2/1985 | Cases et al. |
| 4,501,977 A | 2/1985 | Koike |
| 4,504,904 A | 3/1985 | Moore et al. |
| 4,506,173 A | 3/1985 | Yum |
| 4,506,341 A | 3/1985 | Kalter et al. |
| 4,508,977 A | 4/1985 | Page et al. |
| 4,511,812 A | 4/1985 | Satake |
| 4,514,650 A | 4/1985 | Yum |
| 4,516,040 A | 5/1985 | Zapisek et al. |
| 4,525,641 A | 6/1985 | Cruz et al. |
| 4,534,008 A | 8/1985 | Fuchs et al. |
| 4,546,273 A | 10/1985 | Osman |
| 4,551,814 A | 11/1985 | Moore et al. |
| 4,551,815 A | 11/1985 | Moore et al. |
| 4,554,640 A | 11/1985 | Wong et al. |
| 4,578,771 A | 3/1986 | O'Hara, Jr. |
| 4,580,215 A | 4/1986 | Morton |
| 4,583,012 A | 4/1986 | Smith et al. |
| 4,609,986 A | 9/1986 | Hartmann et al. |
| 4,617,479 A | 10/1986 | Hartmann et al. |
| 4,645,953 A | 2/1987 | Wong |
| 4,659,947 A | 4/1987 | Ogura et al. |
| 4,659,948 A | 4/1987 | Sunter et al. |
| 4,660,171 A | 4/1987 | Moore et al. |
| 4,661,922 A | 4/1987 | Thierbach |
| 4,675,556 A | 6/1987 | Bazes |
| 4,677,318 A | 6/1987 | Veenstra |
| 4,697,105 A | 9/1987 | Moy |
| 4,703,206 A | 10/1987 | Cavlan |
| 4,717,844 A | 1/1988 | Shima et al. |
| 4,730,130 A | 3/1988 | Baskett |
| 4,740,721 A | 4/1988 | Chung et al. |
| 4,742,252 A | 5/1988 | Agrawal |
| 4,745,573 A | 5/1988 | Lebel |
| 4,745,579 A | 5/1988 | Mead et al. |
| 4,758,746 A | 7/1988 | Birkner et al. |
| 4,758,747 A | 7/1988 | Young et al. |
| 4,758,985 A | 7/1988 | Carter |
| 4,761,570 A | 8/1988 | Williams |
| 4,763,020 A | 8/1988 | Takata et al. |
| 4,772,811 A | 9/1988 | Fujioka et al. |
| 4,774,421 A | 9/1988 | Hartmann et al. |
| 4,786,904 A | 11/1988 | Graham, III et al. |
| 4,796,229 A | 1/1989 | Greer, Jr. et al. |
| 4,815,022 A | 3/1989 | Glaeser et al. |
| 4,818,902 A | 4/1989 | Brockmann |
| 4,831,285 A | 5/1989 | Gaiser |
| 4,831,573 A | 5/1989 | Norman |
| 4,839,539 A | 6/1989 | Takata et al. |
| 4,858,178 A | 8/1989 | Breuninger |
| 4,860,235 A | 8/1989 | Kondou et al. |
| 4,870,302 A | 9/1989 | Freeman |
| 4,876,466 A | 10/1989 | Kondou et al. |
| 4,906,870 A | 3/1990 | Gongwer |
| 4,918,641 A | 4/1990 | Jigour et al. |
| 4,931,671 A | 6/1990 | Agrawal |
| 4,937,475 A | 6/1990 | Rhodes et al. |
| 4,942,319 A | 7/1990 | Pickett et al. |
| 4,963,768 A | 10/1990 | Agrawal et al. |
| 4,965,472 A | 10/1990 | Anderson |
| 4,972,105 A | 11/1990 | Burton et al. |
| 5,015,884 A | 5/1991 | Agrawal et al. |
| 5,033,017 A | 7/1991 | Taniai et al. |
| 5,046,035 A | 9/1991 | Jigour et al. |
| 5,053,647 A | 10/1991 | Shizukuishi et al. |
| 5,075,576 A | 12/1991 | Cavlan |
| 5,168,177 A | 12/1992 | Shankar et al. |
| 5,204,555 A | 4/1993 | Graham et al. |
| 5,210,448 A | 5/1993 | Takata |
| 5,212,652 A | 5/1993 | Agrawal et al. |
| 5,231,588 A | 7/1993 | Agrawal et al. |
| 5,233,539 A | 8/1993 | Agrawal et al. |
| 5,302,865 A | 4/1994 | Steele et al. |
| 5,329,460 A | 7/1994 | Agrawal et al. |
| 5,359,536 A | 10/1994 | Agrawal et al. |
| 5,381,551 A | 1/1995 | Maeda et al. |
| 5,398,198 A | 3/1995 | Mahant-Shetti et al. |
| 5,457,644 A | 10/1995 | McCollum |
| 5,493,239 A | 2/1996 | Zlotnick |
| 5,530,439 A | 6/1996 | Steele et al. |
| 5,640,106 A | 6/1997 | Erickson et al. |
| 5,642,304 A | 6/1997 | Simpson |
| 5,687,325 A | 11/1997 | Chang |
| 5,742,531 A | 4/1998 | Freidin et al. |
| 5,794,033 A | 8/1998 | Aldebert et al. |
| 5,805,477 A | 9/1998 | Perner |
| 5,844,829 A | 12/1998 | Freidin et al. |
| 5,877,742 A | 3/1999 | Klink |
| 5,877,972 A | 3/1999 | Aoki et al. |
| 5,961,576 A | 10/1999 | Freidin et al. |
| 5,995,988 A | 11/1999 | Freidin et al. |
| 6,038,652 A | 3/2000 | Phillips et al. |
| 6,052,770 A | 4/2000 | Fant |
| 6,065,028 A | 5/2000 | Dhong et al. |
| 6,081,903 A | 6/2000 | Vorbach et al. |
| 6,119,048 A | 9/2000 | Kondo et al. |
| RE37,048 E | 2/2001 | McCollum |
| 6,188,240 B1 | 2/2001 | Nakaya |
| 6,209,077 B1 | 3/2001 | Robertson et al. |
| 6,215,327 B1 * | 4/2001 | Lyke .................................. 326/41 |
| 6,311,200 B1 | 10/2001 | Hanrahan et al. |
| 6,353,841 B1 | 3/2002 | Marshall et al. |
| 6,404,227 B1 | 6/2002 | Wasson |
| 6,449,628 B1 | 9/2002 | Wasson |
| 6,476,634 B1 | 11/2002 | Bilski |
| 6,539,477 B1 | 3/2003 | Seawright |
| 6,553,395 B2 | 4/2003 | Marshall et al. |
| 6,573,749 B2 | 6/2003 | New et al. |
| 6,603,332 B2 * | 8/2003 | Kaviani et al. .................. 326/39 |
| 6,625,721 B1 | 9/2003 | Chen |
| 6,704,816 B1 | 3/2004 | Burke |
| 6,732,126 B1 | 5/2004 | Wang |
| 6,754,686 B1 | 6/2004 | Kaviani |
| 6,873,181 B1 | 3/2005 | Pedersen |
| 6,938,223 B2 | 8/2005 | Boppana et al. |
| 6,978,427 B1 * | 12/2005 | Kaviani ....................... 716/117 |
| 7,007,264 B1 | 2/2006 | Baxter |
| 7,028,281 B1 * | 4/2006 | Agrawal et al. ................. 326/41 |
| 7,047,166 B2 | 5/2006 | Dancea |
| 7,164,288 B2 | 1/2007 | Leijten-Nowak |
| 7,193,433 B1 | 3/2007 | Young |
| 7,196,541 B2 | 3/2007 | Nowak-Leijten |
| 7,205,791 B1 | 4/2007 | Lee et al. |
| 7,240,263 B2 | 7/2007 | Bialas, Jr. et al. |

OTHER PUBLICATIONS

Frederick, Michael T. et al., "Beyond the Arithmetic Constraint: Depth-Optimal Mapping of Logic Chains in LUT-based FPGAs", FPGA '08 Feb. 24-26, 2008, Moneterey, CA, ACM 978-1-59593-934-0/08/02, pp. 37-46.

Frederick, Michael T. et al., "Beyond the Arithmetic Constraint: Depth-Optimal Mapping of Logic Chains in LUT-based FPGAs", Iowa State University, 2008 Dissertation, 167 pages.

Frederick, Michael T. et al., "Multi-Bit Carry Chains for High-Performance Reconfigurable Fabrics", Aug. 2006, Research paper par-

(56) References Cited

OTHER PUBLICATIONS tially supported by NSF grants and the Jerry R. Junkins Endowment at Iowa State University, 6 pages.

Frederick, Michael T. et al., "Non-arithmetic Carry Chains for Reconfigurable Fabrics", IEEE 2007, #1-4244-1258-7/07, pp. 137-143.

* cited by examiner

| Design | Normal | | | Forget | | | | | | | | Before | | | | | | | | After | | | | | | | |
|---|---|---|---|---|---|---|---|---|---|---|---|---|---|---|---|---|---|---|---|---|---|---|---|---|---|---|---|
| | G | L | LUT | Go | Lo | SUo | G | L | SU | LUT | λ | Go | Lo | SUo | G | L | SU | LUT | λ | Go | Lo | SUo | G | L | SU | LUT | λ |
| cfft | 5 | 4 | 4639 | 3 | 38 | 1.06 | 5 | 37 | 0.96 | 3958 | 0.85 | 3 | 38 | 1.06 | 5 | 37 | 0.96 | 3764 | 0.81 | 4 | 6 | 1.00 | 4 | 6 | 1.00 | 4640 | 1.00 |
| mlt3x3 | 2 | 34 | 901 | 2 | 33 | 1.03 | 3 | 32 | 0.98 | 997 | 1.11 | 2 | 33 | 1.03 | 3 | 16 | 1.03 | 850 | 0.94 | 2 | 34 | 1.00 | 2 | 34 | 1.00 | 901 | 1.00 |
| reedsol | 9 | 8 | 1411 | 7 | 9 | 1.17 | 10 | 9 | 0.90 | 1401 | 0.99 | 7 | 9 | 1.17 | 10 | 9 | 0.90 | 1401 | 0.99 | 7 | 9 | 1.17 | 10 | 9 | 0.90 | 1407 | 1.00 |
| jpeg | 6 | 15 | 5890 | 4 | 8 | 1.32 | 7 | 8 | 1.14 | 6546 | 1.11 | 4 | 7 | 1.32 | 6 | 6 | 1.18 | 5493 | 0.93 | 5 | 16 | 1.06 | 6 | 16 | 0.97 | 5916 | 1.00 |
| dct | 4 | 8 | 4767 | 2 | 19 | 1.12 | 3 | 19 | 1.00 | 5597 | 1.17 | 2 | 19 | 1.12 | 3 | 19 | 1.00 | 4572 | 0.96 | 3 | 8 | 1.00 | 4 | 8 | 1.00 | 4767 | 1.00 |
| eth | 7 | 6 | 301 | 4 | 6 | 2.00 | 6 | 5 | 1.50 | 307 | 1.02 | 4 | 6 | 2.00 | 6 | 5 | 1.50 | 302 | 1.00 | 5 | 9 | 1.13 | 6 | 5 | 1.03 | 325 | 1.08 |
| usb | 8 | 7 | 3587 | 5 | 8 | 1.35 | 6 | 8 | 1.19 | 3609 | 1.01 | 5 | 8 | 1.35 | 6 | 8 | 1.19 | 3569 | 0.99 | 5 | 8 | 1.35 | 6 | 8 | 1.19 | 3738 | 1.04 |
| xtea | 6 | 36 | 982 | 4 | 36 | 1.13 | 7 | 34 | 0.98 | 1163 | 1.18 | 4 | 36 | 1.13 | 5 | 36 | 1.06 | 1034 | 1.05 | 5 | 31 | 1.10 | 5 | 31 | 1.10 | 990 | 1.01 |
| des3 | 7 | 6 | 946 | 6 | 7 | 1.08 | 6 | 7 | 1.08 | 1056 | 1.12 | 6 | 7 | 1.08 | 6 | 7 | 1.08 | 1056 | 1.12 | 6 | 7 | 1.08 | 6 | 7 | 1.08 | 1064 | 1.12 |
| rsa | 7 | 39 | 1227 | 4 | 36 | 1.25 | 7 | 35 | 1.07 | 1234 | 1.01 | 4 | 36 | 1.25 | 7 | 35 | 1.07 | 1002 | 0.82 | 6 | 38 | 1.07 | 6 | 39 | 1.05 | 1194 | 0.97 |
| md5 | 18 | 78 | 2600 | 13 | 76 | 1.15 | 24 | 74 | 0.90 | 3033 | 1.17 | 14 | 75 | 1.13 | 22 | 71 | 0.96 | 2872 | 1.10 | 15 | 38 | 1.08 | 18 | 68 | 1.03 | 2838 | 1.09 |
| sha512 | 8 | 70 | 5908 | 7 | 72 | 1.01 | 12 | 70 | 0.89 | 6702 | 1.13 | 7 | 69 | 1.04 | 11 | 68 | 0.93 | 5855 | 0.99 | 8 | 70 | 1.00 | 8 | 70 | 1.00 | 5780 | 0.98 |
| twofish | 55 | 54 | 2748 | 20 | 64 | 1.77 | 26 | 55 | 1.65 | 3696 | 1.34 | 20 | 64 | 1.77 | 26 | 55 | 1.65 | 3696 | 1.34 | 20 | 64 | 1.77 | 26 | 55 | 1.65 | 3696 | 1.34 |
| ava | 30 | 34 | 13670 | 8 | 26 | 2.48 | 19 | 29 | 1.44 | 14543 | 1.06 | 8 | 26 | 2.48 | 19 | 29 | 1.44 | 14894 | 1.09 | 8 | 26 | 2.48 | 19 | 34 | 1.36 | 14772 | 1.08 |
| aes128 | 15 | 14 | 13286 | 9 | 15 | 1.37 | 12 | 16 | 1.13 | 15311 | 1.15 | 9 | 15 | 1.37 | 12 | 16 | 1.13 | 15311 | 1.15 | 9 | 15 | 1.37 | 12 | 16 | 1.13 | 15311 | 1.15 |
| Total | 187 | 413 | 62863 | 98 | 453 | — | 153 | 438 | — | 69153 | — | 99 | 448 | — | 147 | 417 | — | 65671 | — | 108 | 379 | — | 138 | 406 | — | 67339 | — |
| Ratio | 1.00 | 1.00 | 1.00 | 0.52 | 1.10 | 1.36 | 0.82 | 1.06 | 1.14 | 1.10 | 1.10 | 0.53 | 1.08 | 1.36 | 0.79 | 1.01 | 1.17 | 1.04 | 1.04 | 0.58 | 0.92 | 1.28 | 0.74 | 0.98 | 1.16 | 1.07 | 1.07 |

*FIG. 8A*

| Design | Normal | | | | Forget | | | | | | Before | | | | | | After | | | | | |
|---|---|---|---|---|---|---|---|---|---|---|---|---|---|---|---|---|---|---|---|---|---|---|
| | G | L | LUT | | $G_o$ | $L_o$ | $SU_o$ | G | L | SU | LUT | λ | $G_o$ | $L_o$ | $SU_o$ | G | L | SU | LUT | λ | $G_o$ | $L_o$ | $SU_o$ | G | L | SU | LUT | λ |
| cfft | 4 | 6 | 4749 | 3 | 36 | 1.11 | 5 | 34 | 1.02 | 3840 | 0.81 | 3 | 36 | 1.11 | 5 | 35 | 1.00 | 3357 | 0.71 | 3 | 41 | 1.00 | 5 | 5 | 1.00 | 4639 | 0.98 |
| mlt3x3 | 2 | 34 | 901 | 2 | 17 | 1.74 | 3 | 17 | 1.54 | 760 | 0.84 | 2 | 17 | 1.74 | 3 | 17 | 1.54 | 754 | 0.84 | 2 | 34 | 1.00 | 2 | 34 | 1.00 | 901 | 1.00 |
| reedsol | 7 | 6 | 1231 | 5 | 11 | 1.04 | 7 | 9 | 0.90 | 1217 | 0.99 | 5 | 11 | 1.04 | 7 | 9 | 0.90 | 1217 | 0.99 | 5 | 11 | 1.04 | 7 | 9 | 0.90 | 1225 | 1.00 |
| jpeg | 6 | 13 | 5875 | 4 | 6 | 1.72 | 6 | 6 | 1.29 | 5059 | 0.86 | 4 | 6 | 1.72 | 6 | 6 | 1.29 | 4916 | 0.84 | 5 | 16 | 1.00 | 6 | 16 | 0.91 | 5887 | 1.00 |
| dct | 4 | 8 | 4767 | 2 | 11 | 1.65 | 3 | 10 | 1.47 | 4123 | 0.86 | 2 | 11 | 1.65 | 3 | 10 | 1.47 | 4059 | 0.85 | 3 | 8 | 1.00 | 4 | 8 | 1.00 | 4767 | 1.00 |
| eth | 6 | 5 | 258 | 4 | 9 | 1.62 | 6 | 6 | 1.42 | 242 | 0.94 | 4 | 9 | 1.62 | 6 | 6 | 1.42 | 242 | 0.94 | 4 | 20 | 1.06 | 6 | 8 | 1.00 | 267 | 1.03 |
| usb | 8 | 7 | 3111 | 5 | 8 | 1.35 | 6 | 8 | 1.19 | 3211 | 1.03 | 5 | 8 | 1.35 | 6 | 8 | 1.19 | 3186 | 1.02 | 5 | 8 | 1.35 | 6 | 8 | 1.19 | 3387 | 1.09 |
| xtea | 6 | 36 | 1009 | 4 | 30 | 1.29 | 6 | 29 | 1.15 | 900 | 0.89 | 4 | 30 | 1.29 | 6 | 29 | 1.15 | 910 | 0.90 | 5 | 32 | 1.13 | 5 | 32 | 1.13 | 974 | 0.97 |
| des3 | 7 | 6 | 824 | 5 | 8 | 1.17 | 6 | 8 | 1.04 | 993 | 1.21 | 5 | 8 | 1.17 | 6 | 8 | 1.04 | 993 | 1.21 | 5 | 8 | 1.17 | 6 | 8 | 1.04 | 1002 | 1.22 |
| rsa | 6 | 38 | 1132 | 4 | 21 | 1.70 | 7 | 20 | 1.37 | 928 | 0.82 | 4 | 21 | 1.70 | 7 | 19 | 1.40 | 912 | 0.81 | 5 | 39 | 1.04 | 6 | 38 | 1.00 | 1135 | 1.00 |
| md5 | 18 | 58 | 2569 | 12 | 52 | 1.41 | 21 | 26 | 1.11 | 2498 | 0.97 | 12 | 51 | 1.43 | 21 | 41 | 1.12 | 2465 | 0.96 | 15 | 51 | 1.06 | 16 | 75 | 1.01 | 2517 | 0.98 |
| sha512 | 8 | 70 | 5518 | 6 | 68 | 1.09 | 10 | 65 | 0.99 | 4854 | 0.88 | 6 | 68 | 1.09 | 9 | 66 | 1.01 | 4828 | 0.87 | 8 | 70 | 1.00 | 8 | 70 | 1.00 | 5358 | 0.97 |
| twofish | 50 | 49 | 2602 | 13 | 60 | 2.01 | 23 | 56 | 1.59 | 3100 | 1.19 | 13 | 60 | 2.01 | 23 | 56 | 1.59 | 3100 | 1.19 | 13 | 60 | 2.01 | 23 | 56 | 1.59 | 3100 | 1.19 |
| ava | 22 | 26 | 13415 | 8 | 24 | 1.92 | 11 | 19 | 1.77 | 11807 | 0.88 | 8 | 24 | 1.92 | 11 | 19 | 1.77 | 11989 | 0.89 | 8 | 24 | 1.92 | 11 | 19 | 1.77 | 12501 | 0.93 |
| aes128 | 13 | 12 | 11939 | 7 | 16 | 1.38 | 11 | 13 | 1.11 | 12703 | 1.06 | 7 | 16 | 1.38 | 11 | 13 | 1.11 | 12703 | 1.06 | 7 | 16 | 1.38 | 11 | 13 | 1.11 | 12703 | 1.06 |
| Total | 167 | 374 | 59900 | 84 | 377 | — | 131 | 326 | — | 56235 | — | 84 | 376 | — | 130 | 342 | — | 55631 | — | 93 | 438 | — | 122 | 399 | — | 60363 | — |
| Ratio | 1.00 | 1.00 | 1.00 | 0.50 | 1.01 | 1.49 | 0.78 | 0.87 | 1.26 | 0.94 | | 0.50 | 1.01 | 1.49 | 0.78 | 0.91 | 1.27 | 0.93 | | 0.56 | 1.17 | 1.25 | 0.73 | 1.07 | 1.16 | 1.01 | 1.01 |

*FIG. 8B*

| Design | Normal | | | Forget | | | | | | | | Before | | | | | | | | After | | | | | | | |
|---|---|---|---|---|---|---|---|---|---|---|---|---|---|---|---|---|---|---|---|---|---|---|---|---|---|---|---|
| | G | L | LUT | Go | Lo | SUo | G | L | SU | LUT | λ | Go | Lo | SUo | G | L | SU | LUT | λ | Go | Lo | SUo | G | L | SU | LUT | λ |
| cfft | 4 | 6 | 4740 | 3 | 19 | 1.79 | 5 | 18 | 1.52 | 3162 | 0.67 | 3 | 20 | 1.72 | 5 | 19 | 1.47 | 3060 | 0.65 | 3 | 41 | 1.00 | 4 | 3 | 1.00 | 4620 | 0.97 |
| mlt3x3 | 2 | 34 | 901 | 2 | 17 | 1.74 | 3 | 16 | 1.60 | 817 | 0.91 | 2 | 17 | 1.74 | 3 | 16 | 1.60 | 748 | 0.83 | 2 | 34 | 1.00 | 2 | 34 | 1.00 | 901 | 1.00 |
| reedsol | 6 | 5 | 1212 | 5 | 6 | 1.10 | 5 | 6 | 1.10 | 1130 | 0.93 | 5 | 6 | 1.10 | 5 | 6 | 1.10 | 1130 | 0.93 | 5 | 6 | 1.10 | 5 | 6 | 1.10 | 1138 | 0.94 |
| jpeg | 5 | 14 | 5875 | 4 | 5 | 1.71 | 5 | 5 | 1.45 | 5248 | 0.89 | 4 | 5 | 1.71 | 5 | 5 | 1.45 | 4789 | 0.82 | 4 | 14 | 1.00 | 5 | 14 | 1.00 | 5877 | 1.00 |
| dct | 3 | 7 | 4766 | 2 | 10 | 1.75 | 3 | 10 | 1.47 | 4441 | 0.93 | 2 | 10 | 1.75 | 3 | 10 | 1.47 | 3993 | 0.84 | 3 | 7 | 1.00 | 3 | 7 | 1.00 | 4766 | 1.00 |
| eth | 6 | 5 | 255 | 4 | 7 | 1.79 | 5 | 6 | 1.62 | 221 | 0.87 | 4 | 7 | 1.79 | 5 | 6 | 1.62 | 218 | 0.85 | 4 | 20 | 1.06 | 5 | 8 | 1.06 | 245 | 0.96 |
| usb | 6 | 5 | 2815 | 4 | 7 | 1.21 | 6 | 6 | 0.96 | 2685 | 0.95 | 4 | 7 | 1.21 | 6 | 6 | 0.96 | 2662 | 0.95 | 4 | 7 | 1.05 | 6 | 6 | 0.96 | 2876 | 1.02 |
| xtea | 5 | 35 | 915 | 4 | 28 | 1.25 | 6 | 28 | 1.09 | 876 | 0.96 | 4 | 28 | 1.25 | 6 | 28 | 1.09 | 746 | 0.82 | 5 | 31 | 1.06 | 5 | 31 | 1.06 | 912 | 1.00 |
| des3 | 4 | 3 | 347 | 4 | 3 | 1.00 | 4 | 3 | 1.00 | 338 | 0.97 | 4 | 3 | 1.00 | 4 | 3 | 1.00 | 338 | 0.97 | 4 | 3 | 1.00 | 4 | 3 | 1.00 | 347 | 1.00 |
| rsa | 6 | 38 | 1120 | 4 | 19 | 1.81 | 7 | 19 | 1.40 | 954 | 0.85 | 4 | 19 | 1.81 | 7 | 19 | 1.40 | 814 | 0.73 | 5 | 38 | 1.06 | 6 | 38 | 1.00 | 1127 | 1.01 |
| md5 | 15 | 52 | 1730 | 11 | 44 | 1.47 | 20 | 44 | 1.09 | 2041 | 1.18 | 11 | 43 | 1.49 | 18 | 43 | 1.16 | 1945 | 1.12 | 13 | 73 | 1.01 | 15 | 72 | 0.97 | 2129 | 1.23 |
| sha512 | 8 | 70 | 5362 | 6 | 68 | 1.09 | 11 | 15 | 0.96 | 4741 | 0.88 | 6 | 68 | 1.09 | 8 | 66 | 1.04 | 4492 | 0.84 | 8 | 70 | 1.00 | 8 | 70 | 1.00 | 5118 | 0.95 |
| twofish | 40 | 39 | 2559 | 13 | 57 | 1.66 | 23 | 45 | 1.36 | 2797 | 1.09 | 13 | 57 | 1.66 | 23 | 45 | 1.36 | 2797 | 1.09 | 13 | 57 | 1.66 | 23 | 45 | 1.36 | 2797 | 1.09 |
| ava | 17 | 21 | 10394 | 8 | 19 | 1.67 | 10 | 18 | 1.50 | 9960 | 0.96 | 8 | 19 | 1.67 | 10 | 18 | 1.50 | 10269 | 0.99 | 8 | 19 | 1.67 | 10 | 18 | 1.50 | 10708 | 1.03 |
| aes128 | 9 | 8 | 3921 | 6 | 12 | 1.17 | 8 | 13 | 0.95 | 4777 | 1.22 | 6 | 12 | 1.17 | 8 | 13 | 0.95 | 4777 | 1.22 | 6 | 12 | 1.17 | 8 | 13 | 0.95 | 4777 | 1.22 |
| Total | 136 | 342 | 46912 | 80 | 321 | — | 121 | 252 | — | 44188 | — | 80 | 321 | — | 116 | 303 | — | 42778 | — | 87 | 432 | — | 109 | 368 | — | 48338 | — |
| Ratio | 1.00 | 1.00 | 1.00 | 0.59 | 0.94 | 1.46 | 0.89 | 0.74 | 1.23 | 0.94 | 0.94 | 0.59 | 0.94 | 1.46 | 0.85 | 0.89 | 1.26 | 0.91 | 0.91 | 0.64 | 1.26 | 1.15 | 0.80 | 1.08 | 1.09 | 1.03 | 1.03 |

FIG. 8C

DEPTH-OPTIMAL MAPPING OF LOGIC
CHAINS IN RECONFIGURABLE FABRICS

GRANT REFERENCE

This invention was made with government support under Grant No. CCF0311061 awarded by NSF. The government has certain rights in the invention.

FIELD OF THE INVENTION

The present invention relates to reconfigurable fabrics, one example of reconfigurable fabrics being FPGAs.

BACKGROUND OF THE INVENTION

Look-up table based FPGAs have migrated from a niche technology for design prototyping to a valuable end-product component and, in some cases, a replacement for general purpose processors and ASICs alike. One way architects have bridged the performance gap between FPGAs and ASICs is through the inclusion of specialized components such as multipliers, RAM modules, and microcontrollers. Another dedicated structure that has become standard in reconfigurable fabrics is the arithmetic carry chain. Currently, it is only used to map arithmetic operations as identified by HDL macros. For non-arithmetic operations, it is an idle but potentially powerful resource.

What is needed is a method of creating logic chains using the arithmetic carry chain in reconfigurable fabrics such as FPGAs and a method to provide for depth-optimal mapping of the logic chains.

Therefore, it is a primary object, feature, or advantage of the present invention to improve over the state of the art.

It is a further object, feature, or advantage of the present invention to provide a formal logic chain definition that encompasses both arithmetic and non-arithmetic operations.

It is a still further object, feature, or advantage of the present invention to create generic logic chains in polynomial time without HDL arithmetic chain macros.

Yet another object, feature, or advantage of the present invention is eliminate or reduce an area trade-off associated with the exclusivity constraint of current FPGA carry chain architectures.

A still further object, feature, or advantage of the present invention is to provide for creating logic chains without HDL.

One or more of these and/or other objects, features, or advantages of the present invention will become apparent from the specification and claims that follow.

BRIEF SUMMARY OF THE INVENTION

The present invention includes ChainMap, a polynomial-time delay-optimal technology mapping algorithm for the creation of generic logic chains in LUT-based FPGAs. ChainMap requires no HDL macros be preserved through the design flow. It creates logic chains, both arithmetic and non-arithmetic, in an arbitrary Boolean network whenever depth increasing nodes are encountered. Use of the chain is not reserved for arithmetic, but rather any set of gates exhibiting similar characteristics. By using the carry chain as a generic, near zero-delay adjacent cell interconnection structure a post-technology mapped average optimal speedup of 1.4× is revealed, and a post-place and route average speedup of 1.05×, with an observed maximum of 1.45×, and decrease routing consumption, with an observed minimum of 0.7×.

According to one aspect of the present invention a method of creating logic chains in a Boolean network of a reconfigurable fabric is provided. The method includes creating a plurality of logic chains in the reconfigurable fabric. The plurality of logic chains include at least one arithmetic logic chain and at least one non-arithmetic logic chain.

According to another aspect of the present invention, a method of configuring a reconfigurable fabric is provided. The method includes using carry chains in the reconfigurable fabric as generic logic chains for arithmetic operations and non-arithmetic operations to provide adjacent cell interconnections.

According to another aspect of the present invention, a method of creating logic chains in a Boolean network of a look-up table based FPGA. The method includes applying a labeling method by finding a depth increasing node, isolating the depth increasing node, and finding minimum height cuts. The method further includes mapping to generate a mapping solution using the minimum height cuts, applying a duplication method to implement an exclusivity constraint, and arranging connections in the look-up table based FPGA using the logic chains.

BRIEF DESCRIPTION OF THE DRAWINGS

FIG. 8A-8C include Tables 1-3 providing performance summaries.

DETAILED DESCRIPTION OF THE PREFERRED EMBODIMENT

The present invention is described with respect to a preferred embodiment. The present invention is not intended to be limited to the preferred embodiment described herein.
Chains in FPGAs Look-up table (LUT) based Field Programmable Gate Arrays (FPGAs) have traditionally been relegated to the realm of prototyping because they lacked the performance necessary to be critical pieces of a production design. However, advances in codesign, process technology, and innovative architectures have narrowed the performance gap between FPGAs and ASICs to the point where their flexibility and relatively low cost have made them justifiable design choices. Modern FPGAs have embedded dedicated components such as multipliers, RAM modules, and microcontrollers along-side reconfigurable logic in an effort to provide the specialized resources to achieve the necessary performance. One important dedicated structure present in nearly all commercially available architectures is the arithmetic carry chain.

Figure 1:
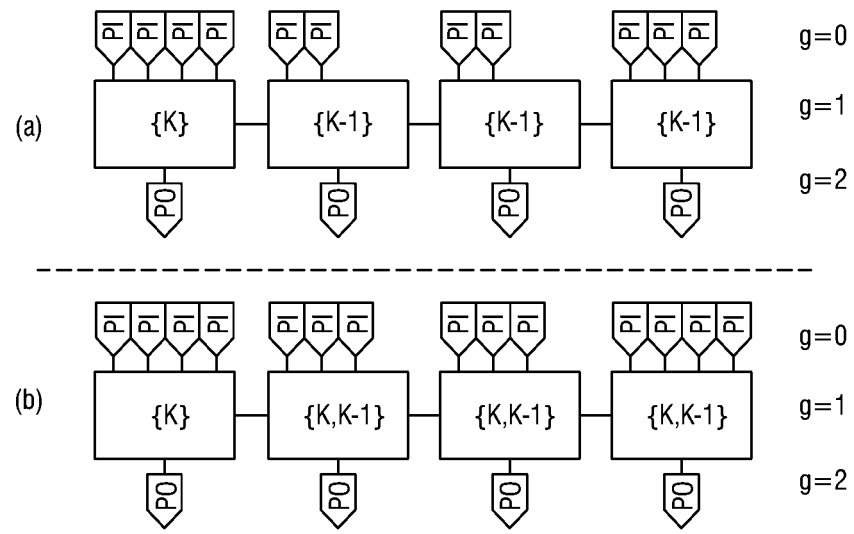
FIG. 1A illustrates a (K−1) carry-select chain.
FIG. 1B illustrates a {K−1, K} heterogeneous logic chain.

Design depth is created by logic and programmable routing connections. The routing array provides flexible interconnection between LUTs. FIG. 1(a) presents an arithmetic chain consisting of logic elements (LEs). Each LE can act as two (K−1)-LUTs or one K-LUT. The primary inputs (PIs) have a routing depth g=0, and for each LE g=1, because the path to any LE in the chain traverses only 1 routing connection and increases only logic depth. The first member of each chain has a logic depth of l=1, while the last has l=4. Carry chains provide near-zero delay transmission of a carry, but are invoked only through hardware description language (HDL) macros. Each chain node is a depth increasing node, one that increases logic depth without increasing routing depth. However, for designs that contain few arithmetic operations and incorporate a carry-select style architecture, the carry chain is an idle resource.

FlowMap [2] and its derivative algorithms solve optimal logic depth mapping in polynomial time. However, they view FPGAs sans the industry standard carry chain. The optimal use of logic chains requires the ability to identify a depth increasing node and implement it in a chain net, thereby minimizing routing depth. Due to the increasing inclusion of FPGAs in deployed systems, the need to fully utilize every architectural resource is imperative, so as to close the performance gap between FPGAs and ASICs.

FPGAs typically use ripple-carry schemes, or variations thereof, for area efficient arithmetic. The Altera Stratix and Cyclone architectures [1] use a carry-select chain, characterized in FIG. 2(a). An LE operating in (K−1) mode contains two (K−1)-LUTs, one driving a chain net through the cout port, and the other driving the general routing array trough gr. These LEs facilitate chains as in FIG. 1(a). The Stratix also incorporates an LUT chain, characterized in FIG. 2(b), wherein one K-LUT simultaneously drives the same logic function to the chain net and general routing. The Stratix LUT chain uses a connection between LEs, separate from the carry chain, to achieve K-LUT mode and form heterogeneous chains as in FIG. 1(b). A modified carry-select architecture presented in [5] operates in either mode depicted in FIG. 2, and forms heterogeneous chains as in FIG. 1(b). It does so without the additional wire required by the Stratix LUT chain, instead reusing the existing carry chain. The presented algorithm assumes an LE that can operate in either mode in FIG. 2, i.e. the Stratix or [5], and is not currently suitable for Xilinx devices or the Stratix II/III.

Architectures supporting logic chains are available, but they are useless unless a CAD tool can efficiently implement them. Current software packages identify arithmetic carry chains through high-level HDL macros and primitives. The LUT chain is mapped by Quartus II during place and route (PNR) according to undisclosed metrics. The only recourse for a designer wanting logic chains is to create them with low level primitives or hand modify the design. The most common academic synthesis tool, SIS [8] does not support arithmetic chains in its internal representation.

There are many variations on technology mapping in literature. Solutions are designed to optimize delay, area, routing congestion, power consumption, or any combination thereof. Unfortunately, the simultaneous optimal solution of multiple performance metrics has been proven NP-complete [3]. FlowMap [2] is the first solution to map a design to a K-LUT architecture with optimal logic depth in polynomial time. It uses the network flow Max-flow Min-cut algorithm [4] to enumerate K-feasible cuts in a network.

Logic depth minimization assumes that the nets connecting LUTs are implemented in programmable routing. Quartus II estimates for its entire Stratix family that the variable routing delay is typically between 300 ps to 2 ns, while a chain net contributes 0 ps of wire delay. By comparison, a Stratix 4-LUT is estimated at 366 ps and carry chain logic at 58 ps. In most circuits, 70% of the delay is due to routing traversals, and most of the remaining due to LUTs. Almost none of the delay is due to the carry chain logic/interconnection.

Clearly, mapping should address routing depth rather than logic depth. Chains are an underutilized, low latency resource waiting to be exploited. This work presents a polynomial time, depth optimal logic chain technology mapping solution, applicable to the Stratix K-LUT chain and the K-width chain reuse cell presented in [5], and easily adapted to standard (K−1) carry-select chains. The motivation is to create generic logic chains not limited to arithmetic operations. Through optimal use of near zero-delay carry nets, designs achieve greater performance. An extension to this is the ability to disregard HDL macros and free the design flow to work on an entire design, unfettered, toward any goal.

The algorithm labels nodes and generates a set of minimum height K-feasible cuts, maps those nodes according to cuts, and duplicates nodes to adhere to characteristics unique to logic chains. Performance is judged using three different methods of handling HDL-defined arithmetic carry chains.

Depth Optimal Chain Mapping

The optimal routing depth technology map solution described by ChainMap is partially based on the optimal logic depth FlowMap [2], and is formulated similarly for ease of comparison. SIS [8] nomenclature is used to describe an arbitrary Boolean network. Such a network can be represented as a directed acyclic graph (DAG) $N=(V, E)$ with vertices V and edges E, where $n=|V|$ and $m=|E|$. Each Boolean gate in the network is represented as a node, and edge(u, v) connects nodes $u,v \in V$ if there exists a net from the output of gate u to an input of gate v. Notation is abused such that $u \in N$ implies that $u \in V$ and $edge(u, v) \in N$ implies $edge(u, v) \in E$ for $N=(V, E)$. A predecessor is defined as a node u such that there exists a directed path from u to v for $u, v \in N$. Likewise, a descendant is a node v such that there exists a directed path from u to v for $u, v \in N$. PIs have no incoming edges and POs have none outgoing. The following definitions will be used in the description of ChainMap:

u, v, w, x are general nodes in a graph

PI(N) and PO(N) refer to the set of primary inputs or outputs of N, respectively I, j are scalar indices used with nodes s is an auxiliary global source node, s.t. $\forall v \in PI(N)$, edge(s, v) is added t denotes a sink node, and $N_t$ is a subgraph of N containing node t and its predecessor nodes and edges s denotes a source node, and $N_s$ is a subgraph of N containing node s and its descendant nodes and edges d is a depth increasing node g(v) is the routing label and l(v) the logic label for v p is a scalar s.t. $p=\max\{g(u):u \in N\}$ q is a scalar s.t. $q=\max\{l(u):u \in N\}$ $P \subset N_t$ s.t. $v \in P$ if $g(v)=p$, $\forall v \in N_t$ $P_d \subseteq P$ consisting of d and its predecessors in P $\overline{N_t'}$ is a DAG with a valid depth increasing node $N_t''$ is derived from $N_t'$ to apply Max-flow Min-cut $d' \in N_t'$ is formed by collapsing the nodes in $P_d$ into d $t' \in N_t'$ is formed by collapsing the nodes in $\overline{P_d}$ into t (X,X̄), (Y,Ȳ), (Z,Z̄) denote node cuts in a network, e.g. nodes are partitioned so that s∈X and t∈X̄ input(H) for a set H⊂N, is the set of {u: ∀u∉H, v∈H, ∃edge(u,v)} and is also abused for nodes output(H) for a set H⊂N, is the set of {u: ∀u∈H, v∉H, ∃edge(u,v)}, and is also abused for nodes cap(u, v) denotes the flow capacity of edge(u, v)

LUT(t) is the set of nodes in the K-LUT of t

Through abuse of notation, a node or set denoted as "prime" indicates to which network it belongs. For example, (X', X̄') is a cut belonging to network $N_t'$. A K-feasible cone $N_v$ is a subgraph of N containing v and each of its predecessors such that input(Nv)≤K. The goal is to cover K-bounded N, where $\forall_{v \in V}$|input(v)|≤K, with K-feasible cones for implementation in a K-LUT FPGA.

The level of t is the longest path from any PI predecessor of {u: u∈PI($N_t$),u≠t} to t, with PIs possessing a level of 0. The distinction that ChainMap makes from FlowMap is that level is in terms of the maximum number of routing connections traversed from PI($N_t$) to t. Chain connections do not count as a routing level increase, therefore, if the longest path between a PI and node t traverses g routing connections and c chain connections, level(t)=g. The depth of the network is the maximum level of all its vertices.

As in FlowMap, the concept of a network cut, (X, X̄), is pivotal. The node cut size, given by Eqn. 1, quantifies the size of input(X̄), i.e. the number of nodes that have a forward edge crossing the cut. To find the K-feasible node cut, the edge cut size will be employed, according to Eqn. 2. For the remainder of the algorithm discussion a unit delay model is incorporated, meaning that cap(u, v)=1, ∀u, v∈V. The logic height of the cut is the maximum node label in X, as in Eqn. 3. The routing height of the cut is the maximum node label in X, as in Eqn. 4.

$$n(X,\bar{X}) = |\{u: \text{edge}(u,v) \in N, u \in X \lor \in \bar{X}\}| \quad (1)$$

$$e(X, \bar{X}) = \sum_{u \in X, v \in \bar{X}} \text{cap}(u, v) \quad (2)$$

$$h_L(X,\bar{X}) = \max\{l(u): u \in X\} \quad (3)$$

$$h_G(X,\bar{X}) = \max\{g(u): u \in X\} \quad (4)$$

The primary objective is to minimize the network routing delay by minimizing $h_G(X, \bar{X})$ for all nodes. Using a binary depth model, each routing net increases routing depth by 1, but it is not increased by any chain net. The secondary objective is to minimize the logic delay of the network by minimizing $h_L(X, \bar{X})$ for all nodes such that $h_G(X; \bar{X})$ is minimum, because network delay is also defined by the delay through its K-LUTs. A third objective is to minimize the area of the design in terms of the number of K-LUTs required by the solution. A solution is optimal if the network routing depth is minimum and the logic depth, within the confines of minimum routing depth, is also minimum.

ChainMap consists of three phases: labeling, mapping, and duplication, with an optional fourth, relaxation. In the labeling phase, ChainMap identifies whether or not a DAG can be constructed that consists of a given node t and its predecessors, and contains a depth increasing node d. If such a DAG is possible, two subsequent graph transformations are applied that isolate d in $N_t'$ and convert the network to $N_t''$, one to which Max-flow Min-cut can be applied. If a K-feasible cut can be found, then t does not increase the routing depth of the design. If t=d, this is akin to the minimum height logic cut identified by FlowMap, and contains all other possible cuts. The second phase of ChainMap is identical to that of FlowMap, wherein the K-feasible cuts computed during labeling are used to form K-LUTs. The third phase of ChainMap is to duplicate nodes that source multiple chain nets to adhere to the special constraints imposed by chains. An optional relaxation phase can be applied to restrict the number of duplications required.

ChainMap Labeling

ChainMap correlates g(v) to the general routing depth of node v. This is a subtle change in definition from FlowMap, which uses l(v) to indicate both logic and routing depth because it considers all nets to be routing connections. The introduction of the logic chain provides for a net with properties different from general routing. A chain net allows any u∈input(v) to cause l(v)=l(u)+1 while allowing for the possibility that g(v)=g(u).

Figure 3:
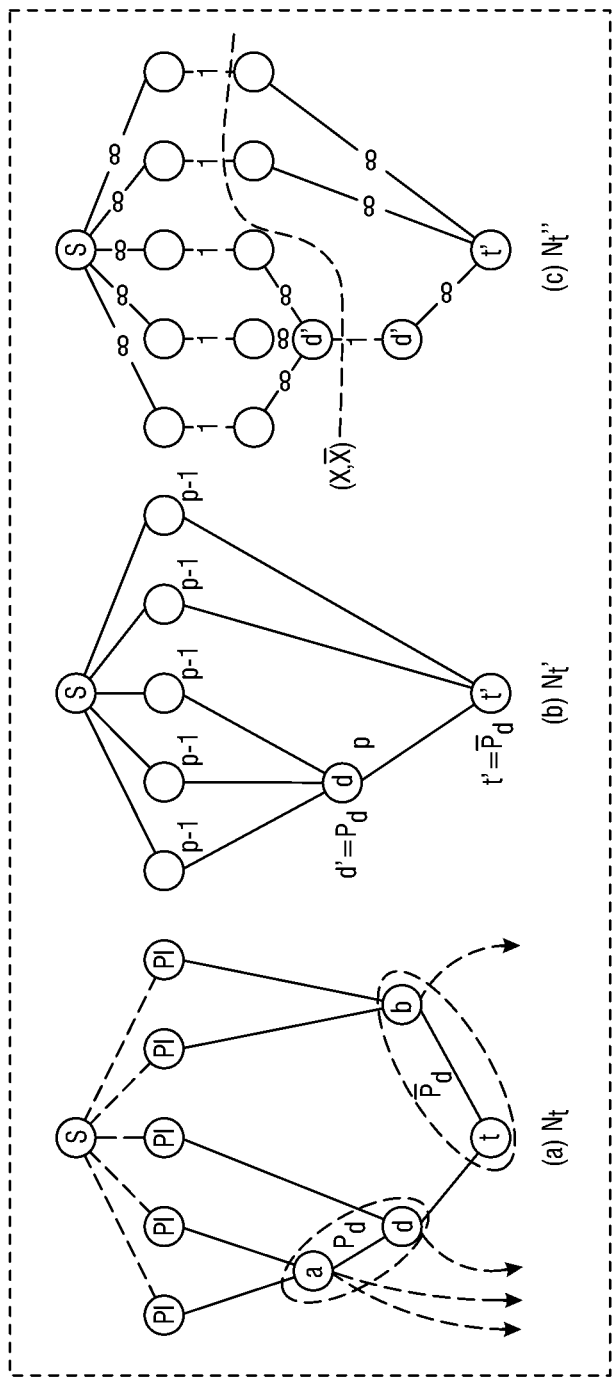
FIG. 3 illustrates transformation from Boolean network $N_t$ to DAGs $N_t'$ and $N_t''$ for chain cut.

The labeling phase is performed on a topological ordering of the nodes in N, ensuring that node u∈input(v) is processed before v. N is K-bounded, meaning input(u)≤K, ∀u∈N. Each u∈PI(N) has g(u)=l(u)=0. FIG. 3(a) shows an example $N_t$ where all edges traversing to u=∉$N_t$ have been pared away, and the auxiliary source s added.

If LUT(t) denotes the set of nodes in the K-LUT which implements t, then X̄=LUT(t) and X=$N_t$–LUT(t). Given X and X̄, a K-feasible cut (X, X̄) is formed such that s∈X and t∈X̄ and n(X, X̄)≤K. A depth increasing node is one which is solely responsible for increasing the routing depth of LUT(t).

DEFINITION 2.1. Let node d∈input(X̄) be a node with maximum label g(d)=p. If g(d)>g(v); ∀v∈input(X̄); v≠d, then d is depth increasing.

Let u∈X be a node with p=g(u) and d be a depth increasing node, then the routing label of t is g(t)=p if d∈X and g(t)=g(u)+1 otherwise. Eqn. 4 indicates that to minimize the $h_G(X; \bar{X})$ of LUT(t), the minimum height K-feasible cut (X, X̄) must be found in $N_t$.

LEMMA 2.2. The minimum routing depth solution of $N_t$ is given by:

$$g(t) = {}_{\text{K-feasible}(X,\bar{X})}^{\min} h_G(X,\bar{X}) + \begin{cases} 0 & \text{if } d \in X \\ 1 & \text{otherwise} \end{cases}$$

Let v∈X be the maximum logic label q=l(v), then l(t)=l(v)+1. The logic label of t is dependent on the K-feasible minimum height routing cut (X, X̄). Because the nodes in X and X̄ represent nodes in different LUTs, logic depth simply increases at each routing cut.

LEMMA 2.3. The logic depth of Nt is given by:

$$l(t) = h_L(X,\bar{X}) + 1$$

Furthermore, for any t, g(t)≥g(u) and l(t)≥l(u), ∀u∈input(t). This is important because the value g(t) has two possibilities: if a minimum height cut can be found at $h_G(X, \bar{X})$=p−1 or $h_G(X, \bar{X})$=p, d∈X then g(t)=p, otherwise g(t)=p+1. Likewise, the logic label of t follows a similar derivation and its proof is identical to that presented by Lemma 2 in FlowMap [2]. For purposes of discussion, this proof is excerpted as Lemma 2.5. Lemmas 2.4 and 2.5 ensure that the routing and logic labels of each node are greater than or equal to any of their predecessors.

LEMMA 2.4. If p is the maximum routing label of the nodes in input(t), then g(t)=p or g(t)=p+1.

PROOF. If u∈input(t), then any cut (X, X̄)∈$N_t$ results in either u∈X or u∈X̄.

When u∈X, Eqn. 4 requires that $h_G(X, \bar{X})$≥g(u) and by Lemma 2.2 g(t)≥$h_G(X, \bar{X})$, therefore, g(t)≥g(u).

Figure 4:
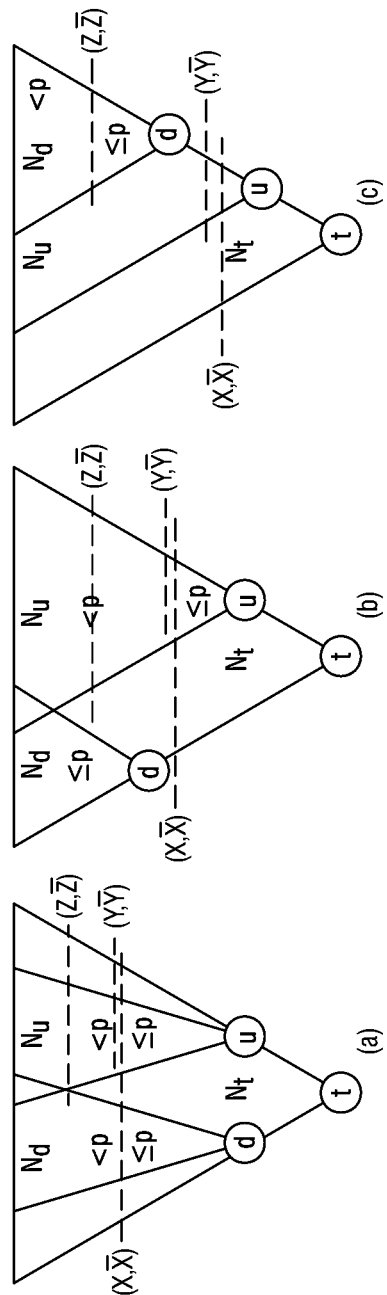
FIG. 4 is a conceptual illustration for (a) $d \notin N_u$, $g(t) = h(X,\overline{X})+1$ (b) $d \notin N_u, g(t)=h(X,\overline{X})$ and (c) $d \notin N_u, g(t)=h(X,\overline{X})$.

When u∈X̄, the K-feasible cut (X, X̄) defines a K-feasible cut (Y, Ȳ) in $N_u$, where Y=X∩$N_u$ and Ȳ=X̄∩$N_u$. Let (Z,Z̄) be the minimum height K-feasible cut computed for $N_u$. Since $(Z, \overline{Z})$ is the minimum height cut, then $h(Y, \overline{Y}) \geq h(Z, \overline{Z})$ because $Z \subset Y$. Likewise, since $Y \subset X$, $h(X, \overline{X}) \geq h(Y; \overline{Y})$, therefore, $h(X, \overline{X}) \geq h(Z, \overline{Z})$. There are two possible values for both $g(t)$ and $g(u)$ according to Lemma 2.2, resulting in four possible cases. FIG. 4(a) applies to i and ii, while (b) applies to iii and iv.

(i) If $g(t)=h(X, \overline{X})+1$, $g(u)=h(Z, \overline{Z})$, then $g(t) \geq h(X, \overline{X}) \geq h(Z, \overline{Z})=g(u)$, thus $g(t) \geq g(u)$.

(ii) If $g(t)=h(X, \overline{X})+1$, $g(u)=h(Z, \overline{Z})+1$, then $g(t)-1=h(X, \overline{X}) \geq h(Z, \overline{Z})=g(u)-1$, thus $g(t) \geq g(u)$.

(iii) If $g(t)=h(X, \overline{X})$, $g(u)=h(Z, \overline{Z})$, then $g(t)=h(X, \overline{X}) \geq h(Z, \overline{Z})=g(u)$, thus $g(t) \geq g(u)$.

(iv) If $g(t)=h(X, \overline{X})$, $g(u)=h(Z, \overline{Z})+1$, then $d \in X$. By Def. 2.1, $g(d) \geq g(v)$, $\forall v \in input(\overline{X})$, $v \neq d$. If d Y then all of Y is less than $g(d)$, and $g(t)=h(X\overline{X})=g(d)>h(Y,\overline{Y}) \geq h(Z,\overline{Z})=g(u)-1$, thus $g(t) \geq g(u)$. If $d \in Y$, FIG. 4(c), then $g(t)=h(X, \overline{X})=h(Y, \overline{Y})=g(d)$. Because d is a depth increasing node of t, and $input(\overline{Y}) \subset input(\overline{X})$ then d is also a depth increasing node of u, but it is known that $g(u)=h(Z, \overline{Z})+1$, which by Lemma 2.2 indicates $d \notin Z$, implying $d \not\subset Z$. Since $d \in \overline{Z}$, then $h(Z, \overline{Z})=g(d)-1$. Therefore, $g(t)=g(d)=h(Z,\overline{Z})+1=g(u)$, thus $g(t)=g(u)$.

A valid alternative K-feasible cut is when $(N_t-\{t\},\{t\})$ because N is K-bounded. In this situation, any node $u \in N_t-\{t\}$ is either $u \in input(t)$ or a predecessor of those nodes, such that $u \in N_t-input(t)-\{t\}$. Therefore, the maximum routing label, $g(u)=p$, where $u \in N_t-\{t\}$, and $h_G(N_t-\{t\},\{t\})=p$, resulting in $g(t) \leq p+1$. Items i-iv prove $g(t) \geq g(u)$; $\forall u \in input(t)$, thus $p \leq g(t) \leq p+1$.

LEMMA 2.5. If q is the maximum logic label of the nodes in $input(t)$, then $l(t)=q$ or $l(t)=q+1$.

PROOF. If $u \in input(t)$, then any cut $(X, \overline{X}) \in N_t$ results in either $u \in X$ or $u \in \overline{X}$.

When $u \in X$, Eqn. 3 requires that $h_L(X, \overline{X}) \geq l(u)$ and by Lemma 2.3 $l(t) \geq h_L(X, \overline{X})$, therefore, $l(t) \geq l(u)$.

When $u \in \overline{X}$, $(X, \overline{X})$ defines a cut $(Y, \overline{Y})$ in $N_u$, where $Y=X \cap N_u$ and $\overline{Y}=\overline{X} \cap N_u$. Therefore, $h_L(X, \overline{X}) \geq h_L(Y, \overline{Y})$ because $Y \in X$ indicating that $l(u) \leq hL(Y, \overline{Y}) \leq h_L(X, \overline{X}) \leq l(t)$. Therefore all predecessors of $u \in N_t-\{t\}$ are $l(u) \leq l(t)$. This implies that $l(u) \leq l(t)$, $\forall u \in input(t)$, resulting in $l(t) \geq q$.

A valid alternative K-feasible cut is $(N_t-\{t\}, \{t\})$ because N is K-bounded. In this situation, any $u \in N_t-\{t\}$ is either $u \in input(t)$ or a predecessor of those nodes, such that $u \in N_t-input(t)-\{t\}$. Therefore, the maximum logic label, $l(u)=q$, where $u \in N_t-\{t\}$, and $h_L(N_t-\{t\},\{t\})=q$, resulting in $l(t) \leq q+1$. Therefore, $q \leq l(t) \leq q+1$.

Lemma 2.4 dictates minimum routing depth is achieved if $g(t)=p$, either by a depth increasing node d, or by $g(u)=p-1$; $\forall u \in N_t-LUT(t)$. Each $v \in N_t$ for which $g(v)=p$ or $v=t$ belongs to set P and is an eligible depth increasing node. To see if any $d \in P$ is depth increasing, P must be partitioned into $P_d$ and $\overline{P}_d$, as in FIG. 3(a). For any $d \in P$, a depth first search (DFS), toward PIs rooted at d and in P, yields $P_d$ and $\overline{P}_d=P-P_d$. FIG. 3(a) shows $P_d=\{d, a\}$, which constitutes a logic chain at level p, and $\overline{P}_d=\{t, b\}$, which constitutes LUT(t). If $\overline{P}_d \neq \emptyset \in P_d$ and consists of nodes potentially included in LUT(t), and its contents collapsed into t to form t'. If $d=t$, $\overline{P}_d=\emptyset$ indicating that LUT(t) includes all of the nodes in P (as $P=P_d$), and the contents of P are collapsed into t to form t'.

LEMMA 2.6. Let set P contain $\{v: v \in N_t; g(v)=p\}=\{t\}$. For $d \in P$, let $P_d$ be the DFS tree rooted at d and in P, and $\overline{P}_d=P-P_d$. $N_t'$ contains a depth increasing node d if there exists no $edge(u; v)$, where $u \in P_d-\{d\}$ and $v \in \overline{P}_d$.

PROOF. If $d=t$, then $\overline{P}_d=\emptyset$ and t' is formed by collapsing P. Here, because t is not a predecessor of any node yet labeled in N it is assumed to be the depth increasing node of its unknown descendant until proven otherwise.

When $d \neq t$, t' is created by collapsing the nodes in $\overline{P}_d$. The lack of an edge connecting any node in $P_d-\{d\}$ to any in $\overline{P}_d$ indicates that $g(u)<p$, $\forall u \in input(t')$, $u \neq d$. Using proof by contradiction, assume d is a valid depth increasing node and that there exists $edge(u; v)$, where $u \in P_d-\{d\}$ and $v \in \overline{P}_d$. It is known $g(d)=p$ and $d \neq u$, implying $g(u) \geq p$. Therefore, $(N_t-\overline{P}_d; \overline{P}_d)$ defines a cut where u; $d \in input(\overline{P}_d)$ and $g(u)=g(d)=p$. By Def. 2.1, d isn't a valid depth increasing node because $\exists edge (u; v) \in N_t$ where $d \neq u$, which is a contradiction.

The presence of a valid $d \in N_t$ can be ensured, however, it doesn't guarantee that it can be identified correctly. $N_t'$ doesn't guarantee that a K-feasible cut, if it exists, will not divide $P_d$ and result in an invalid routing cut $(X, \overline{X})$ s.t. $g(u)=g(v)$, $\forall u; v \in input(\overline{X})$, $u \neq v$, $d \in \overline{X}$. The solution is to collapse all of the nodes of $P_d$ into d', as in FIG. 3(b), thereby creating $N_t'$ with d' as the lone predecessor node of t' with $g(d')=p$ when $d \neq t$, and $d'=t'$ when $d=t$. As there may be more than one valid depth increasing node, all $d \in P$ must be tested as a valid depth increasing node and for K-feasible cut. Using Lemma 2.5, the logic label can be used to select the d that produces minimum $h_L(X, \overline{X})$.

Any $N_t$ that does not contain a d is deemed invalid and is eliminated from consideration. The case when $d=t$ implies that $g(t)=p$ and t is regarded as the first cell in a chain. If a valid $N_t'$ is formed, and a K-feasible cut is found in it, a corresponding K-feasible cut can be found in $N_t$.

LEMMA 2.7. Given a valid $N_t'$ with d', $N_t$ has a p-1 height K-feasible routing cut when $d \in \overline{X}$ and p when $d \in X$ if and only if $N_t'$ has a K-feasible routing cut.

PROOF. Let T denote the set of nodes in Nt that are collapsed into t' and D denote the set of nodes in $N_t$ that are collapsed into d'.

If $d' \in \overline{X}'$ or $d'=t'$, then $\overline{X}=(\overline{X}'-\{d', t'\}) \cup D \cup T$ and $X=X'$. Accordingly, $(X, \overline{X})$ is a K-feasible cut of $N_t$ because $input(\{d', t'\})=input(D \cup T)$. Consequently, $h_G(X, \overline{X}) \leq p-1$ because $X'=X$ does not contain any node with routing label p or higher, as all such nodes are located in $(D \cup T) \subset \overline{X}$. According to Lemma 2.4, $g(t) \geq p$ implies that $h_G(X, \overline{X}) \geq p-1$. Since $p-1 \leq h_G(X, \overline{X}) \leq p-1$, then $h_G(X, \overline{X})=p-1$.

If $d' \in X'$, then $\overline{X}=(\overline{X}'-\{t'\})) \cup T$ and $X=(X'-\{d'\}) \cup D$. Accordingly, $(X, \overline{X})$ is a K-feasible cut of $N_t$ because $input(t')=input(T)$. Lemma 2.6 yields $h_G(X, \overline{X})=p$ because $g(d)=p$ and $d \in X$. Furthermore, Lemma 2.6 indicates that $g(u)<p$, $\forall u \in input(\overline{X})$, $u \neq d$.

Using a valid $N_t'$ with d', the flow residual graph $N_t''$ is constructed. The node cut-size problem is transformed to an edge cut-size problem by splitting each node, allowing the use of the Max-flow Min-cut algorithm. For $\{v: v \in N_t'', v \neq s, v \neq t'\}$, replace $\{v\}$ with $\{v_1, v_2\}$ connected by bridging edge $(v_1, v_2)$ with $cap(v_1, v_2)=1$, $input(v_1)=input(v)$, and $output(v_2)=output(v)$. Give all non-bridging edges infinite capacity. The result is flow residual graph $N_t''$ to which the Max-flow Min-cut algorithm can be applied to determine if there is a K-feasible cut, and therefore a corresponding cut in $N_t'$ [4]. This technique is exactly the same as that used in Lemma 4 of FlowMap [2] and is summarized in Lemma 2.8.

LEMMA 2.8. $N_t'$ has a K-feasible routing cut if and only if $N_t''$ has a K-feasible routing cut.

PROOF. Using the Max-flow Min-cut Theorem [4], $N_t''$ has a cut with $e(X'', \overline{X}') \leq K$ if and only if the maximum flow between s and t' is no more than K. Each bridging edge in flow residual graph $N_t''$ has capacity of 1, thus the augmenting path algorithm can be used to find maximum flow. If K+1 augmenting paths are found, $N_t''$ cannot possess a K-feasible edge cut. If K or fewer augmenting paths are found, $e(X'',$ $\overline{X}''$)≤K, resulting in a disconnection of the $N_t''$ before finding the $(K+1)^{th}$ path. The K-feasible node cut $(X'', \overline{X}'')$ can be identified by performing a DFS rooted at s on the nodes in $N_t''$ that are reachable in the residual graph. $N_t''$ induces a node cut $(X', \overline{X}')$ in $N_t'$ by creating u∈input($\overline{X}'$) corresponding to $u_1$∈input($\overline{X}''$).

The ability of the depth increasing node to be any $\{d: d \in N_t, g(d)=p\}$ creates multiple valid LUT(t) sets, each with equal routing depth but potentially different logic depth. For each $N_t$ with a K-feasible node cut as found in $N_t''$, the optimal overall depth cut can be found by choosing the minimum $h_L(X_t, \overline{X}_t)$ according to Eqn. 3.

LEMMA 2.9. If $h_L(X_t, \overline{X}_t) \geq h_L(X, \overline{X})$, the minimum routing and logic depth solution of $N_t$ is $(X_t, \overline{X}_t) = (X, \overline{X})$.

Let m be the number of edges in $N_t$. Given the preceding discussion, a minimal depth solution uses a O(n) search for d, a O(m+n) DFS search for its predecessors, and O(K·m) to identify the minimum depth routing cut for each d.

THEOREM 2.10. A minimum height routing cut with minimum logic depth in $N_t$ can be found in O($n^2$+K·m·n).

Applying Theorem 2.10 in topological order yields a labeling of $N_t$ such that the routing depth of t is minimum and, within its confines, the logic depth is also minimum. This yields a complete labeling solution for each node in N.

COROLLARY 2.11. A minimum depth solution of N can be found in O($n^3$+K·m·$n^2$).

ChainMap Mapping

The mapping phase of the ChainMap algorithm is identical to that of FlowMap and its proof is reproduced here for the sake of completeness. It consists of creating a set T that initially contains all the POs. For each t∈T, a minimum height cut $(X_t, \overline{X}_t)$ was computed during labeling. Using this cut, t' is created from the nodes in $\overline{X}_t$ and is the K-LUT implementing all nodes in $\overline{X}$ t. T is updated as (T−{t}∪input(t'), and the process is repeated until all of the nodes in T are PIs. It remains valid for ChainMap as long as node labeling is performed as prescribed in Sec. 2.1.

THEOREM 2.12. For any K-bounded Boolean network N, ChainMap produces a K-LUT mapping solution with minimum depth in O(m+n) time.

PROOF. By induction, for any node t∈N, if a K-LUT t' is generated for t during the mapping phase, then the level of t' in the mapping solution is no more than g(t) and l(t), the depth of the optimal mapping solution for $N_t$. Since any mapping solution for N induces a solution for $N_t$, g(t) and l(t) are also the minimum depths for the K-LUT generated for t in and mapping solution of N. Therefore, the mapping solution of N is optimal and requires O(n+m) time [2].

COROLLARY 2.13. Labeling requires O($n^3$+K·m·$n^2$), and mapping requires O(n+m). Hence, the first two stages of ChainMap are polynomial in O($n^3$+K·m·$n^2$)+O(n+m)=O(n3+K·m·$n^2$). In practice, m=O(K·n) and K={4, 5, 6}, making their runtime O($n^3$).

A logic chain is defined as a series of depth increasing nodes, such that the logic depth of each consecutive chain node increases, while the routing depth remains constant.

DEFINITION 2.14. A logic chain is a subnetwork $L \subseteq N$ such that $g(u_j)=g(u_i)$, $l(u_j)=l(u_i)+1$, $\forall u_i; u_j \in L$.

ChainMap Duplication

The exclusivity constraint of chains is defined as the requirement that a chain net be a single-source, single-sink relationship between adjacent LEs. When the network is viewed as a set of LUTs, as in SIS internal representation, it means that a node t can have at most two chain outputs u and v. However, there are constraints on which LUTs can be part of the same LE, assuming that an architecture allows a full K-LUT function on the chain. Note that a discussion of N now assumes that the mapping phase has been applied, thus references to t indicate the actual K-LUT formed by collapsing the nodes in LUT(t) to t.

LEMMA 2.15. For each t∈N, if {u, v: u, v∈output(t), v≠u, g(t)=g(u)=g(v)} satisfy the following constraints, {u, v} can populate the same LE. If any u cannot be paired with any v, u is implemented in an LE by itself.

(i) If input(u)=input(v) and |input(u)|=|input(v)|=K, then u and v must compute the same function.

(ii) If |input(u)∪input(v)|<K, then u and v can compute separate functions.

(iii) For a pair u, v∈output(t), g(w)>g(u); ∀w∈output(u) and g(x)=g(v), ∀x∈output(v).

(iv) u∉input(v) and v∉input(u).

| Algorithm 1 The ChainMap Algorithm | | |
|---|---|---|
| 1: | procedure ChainMap(N) | |
| 2: | for v ∈ N do | ▷ Phase 1:Labeling |
| 3: | l(v) = g(v) = 0 | |
| 4: | end for | |
| 5: | T = N − PI(N) in topological order | ▷ O(n + m) |
| 6: | while \|T\| > 0 do | |
| 7: | T =T − {t}; $N_t$ = DFS(N, t); add global source s | |
| 8: | let p = max{g(u) : u ∈ input(t)}; | |
| 9: | let q = max{l(u) : u ∈ input(t)} | |
| 10: | $\overline{X}_t$ = θ; | |
| 11: | let P = {u : u ∈ $N_t$, g(u) = p} in topological order | |
| 12: | for {d : d ∈ P} do | ▷ Test all g(d)=p cuts |
| 13: | let $P_d$ = DFS(P, d); $\overline{P}_d$ = P − $P_d$ | ▷ Predecessors of d with g(v)=p |
| 14: | if ∃edge(u, v); ∀ u ∈ $P_d$ − {d}, v ∈ $\overline{P}_d$ then | |
| 15: | $N_t$ is invalid for d, skip rest of for loop | |
| 16: | end if | |
| 17: | form d' by collapsing u ∈ $P_d$ into d | |
| 18: | if $\overline{P}_d$ = θ then t' = d' | |
| 19: | else | |
| 20: | form t' by collapsing u ∈ $\overline{P}_d$ into t | |
| 21: | end if | |
| 22: | create $N'_t$ with t' and d' | |
| 23: | split {v : v ∈ $N'_t$: v ≠ s, v ≠ t} into {$v_1$; $v_2$} | |
| 24: | assign cap($v_1$, $v_2$) = 1 to bridge edges, ∞ to all others | |
| 25: | MaxFlowMinCcut( $N''_t$) | ▷ Compute max-flow, min-cut O(Kmn) |
| 26: | if {∃ (X'', $\overline{X}$ '') : e(X'', $\overline{X}$ '') ≤ K} then | |

-continued

Algorithm 1 The ChainMap Algorithm

```
27:            induce (X', X̄ ') in N'_t from (X'', X̄ '') in N'_t
28:            induce (X, X̄) in N_t from (X', X̄ ') in N'_t
29:            if h_L(X, X̄) < h_L(X_t, X̄_t) then
30:              X̄_t = X̄; X_t = X
31:            end if
32:          end if
33:        end for
34:        if X̄ t ≠ θ then                      ▷ If found a valid cut
35:          g(t) = p; l(t) = h_L(X_t, X̄_t) + 1
36:        else
37:          g(t) = p + 1; l(t) = h_L(X_t; X̄_t) + 1
38:        end if
39:      end while
40:      T = PO(N)                              ▷ Phase 2:Mapping
41:      while {t : t ∈ T, t ∉ PI(N)} do
42:        form LUT t' by collapsing v ∈ X̄_t into t
43:        T = (T − {t}) ∪ input(t')
44:      end while
45:      RelaxChains(N) .                       ▷ Optional Relaxation
46:      T = N − PI(N) in reverse topological      Phase 3:Duplication
47:      while T ≠ θ do
48:        T = T − {t};
49:        L = {u; v : u, v ∈ output(t), g(t) = g(u) = g(v)}
50:        for u, v ∈ L do
51:          if {u, v} is a valid LE and L − {u, v} ≠ θ then
52:            Create t' as a duplicate of node t
53:            output(t) = output(t) − {u, v}; output(t') = {u, v}
54:            L = L − {u, v}
55:          end if
56:        end for
57:        while |L| > 1 do
58:          L = L − {u}
59:          output(t) = output(t) − {u}; output(t') = {u}
60:        end while
61:      end while
62:    end procedure
```

In Lemma 2.15(i), the number of distinct inputs for nodes {u, v} meeting |input(u)∪input(v)|≤K does not necessarily ensure that the computation resources are available in an LE. If either |input(u)|=K or |input(v)|=K, then {u, v} cannot reside in the same LE because there can only be one K-input function computed by the LE, as in FIG. 2(b). However, if both |input(u) u)|≤K and |input(v)|≤K, the LE has enough LUT resources to accommodate both sub-width functions, reflected in Lemma 2.15(ii), and in FIG. 2(a). Exclusivity also requires that outputs of u and v are heterogeneous. That is, u must only source a routing net, while v must only source a chain net, as in Lemma 2.15(iii). This constraint indicates that an LE has only one available cout port and one sum port. It should be noted that the use of the terms cout and sum refer only to the type of net a node drives, chain or routing, respectively. It does not indicate the Boolean function computed by either node, it is merely borrowed nomenclature from carry-select addition. If nodes u and v are to be contained in the same LE, one must exclusively use the cout port, and one must exclusively use the sum port. Finally, Lemma 2.15(iv) indicates u and v cannot be dependent on each other because there is not internal LE connection between the sum and cout LUTs.

Figure 5:
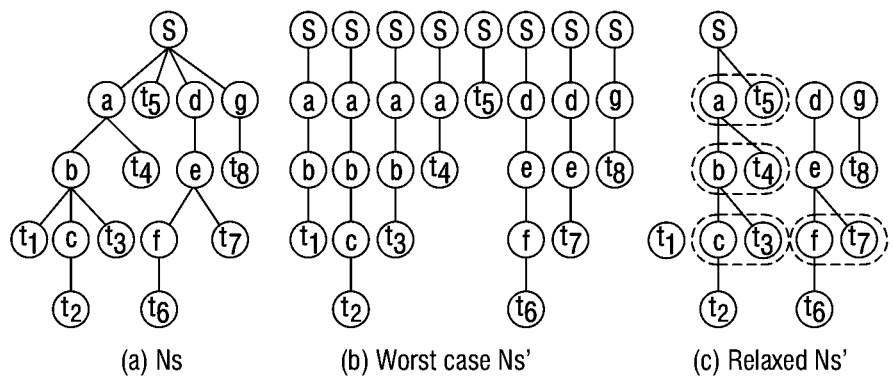
FIG. 5 illustrates a chain tree (a) before, (b) worst case duplication, and (c) average case with relaxation.

If a node has more than one chain net output, it must be duplicated if its descendants cannot meet the aforementioned constraints. FIG. 5(a) shows a logic chain tree formed by ChainMap. In it, all routing nets are omitted, and all nodes are in logic chains. Original internal nodes are white, leaf nodes are black, and duplicate nodes are gray. Using output(b)={$t_1$, $t_3$, c} as an example, assume no LEs can be formed of any pair. This precipitates two duplications of b, which causes output (a)={b, $t_4$} to change to output(a)={$t_4$, b, b, b}. Assuming no LEs can be formed of any pair in {$t_4$, b, b, b}, a is duplicated three times, which causes s to be duplicated at least three times. This pattern continues for all nodes in FIG. 5(a), resulting in FIG. 5(b).

LEMMA 2.16. The number of node duplications required in N to satisfy exclusivity is $O(n^2)$.

PROOF. Let $N_S$ be a subgraph consisting of edges and nodes discovered in a depth first search rooted at s∈N, such that for u∈$N_s$, v∈output(s), v is visited only if g(u)=g(v). By Def. 2.1, there can only exist one edge(u, v)∈$N_s$, ∀u, v∈$N_s$. Therefore, $N_s$ is a logic chain tree with leaf nodes denoted $t_i$; 1≤i≤|V($N_S$)|, as in FIG. 5(a). Additionally, there exists a logic chain $L_j$, 1≤j≤|V($N_S$)| from s to ti, pursuant to Def. 2.14.

The worst case area expansion occurs when u is duplicated • edge(u, v), ∀u, v∈$N_s$, v∈output(u). This implies the duplication network $N_s'$ consists of each path from s to $t_i$ duplicated in its entirety. FIG. 5(b) demonstrates that $N_s'$ consists of a logic chain for each $t_i$, because 1≤i, j≤|V($N_s$)|, |V($N_s'$)|=O(|V($N_s$)|)·O(|V($N_s$)|). Therefore, for N with n nodes, the number of duplications is $O(n^2)$.

THEOREM 2.17. For any K-bounded Boolean network N, a $O(n^2)$ expansion is performed for n nodes in N, and ChainMap produces a depth optimal solution valid within the exclusivity constraint in $O(n^3)$ time.

COROLLARY 2.18. The labeling phase of ChainMap requires $O(n^3+K·m·n^2)$, the mapping phase requires $O(n+m)$, and duplication requires $O(n^3)$. This makes the entire ChainMap algorithm polynomial in $O(n^3+K·m·n^2)+O(n+m)+O(n^3)=O(n3+K·m·n^2)$. In practice, m=O(K·n) and K={4, 5, 6}, making the complete runtime $O(n^3)$.

The ChainMap algorithm is presented in Algorithm 2.2 and includes all three stages. ChainMap maintains a polynomial O($n^3$) runtime with mapped solution area bound by O($n^2$) of the original network. Area is a big concern because Chain-Map assumes its routing delay is equivalent to that encountered in a traditional mapping solution. If the worse case is encountered, the increased wire length usurps any performance gains. Duplication is combated by relaxing chain nets to allow more nodes to comply with Lemma 2.15.

ChainMap Relaxation

The classic trade-off between area and speed is extremely evident in ChainMap solutions. Results indicate full duplication yields highly prohibitive area increases. For example, the number of 5-LUTs in traditional mapping versus a ChainMap solution increases from 4,752 to 9,835 for cf ft (K=5, before, 2.07×). Relaxation of routing depth can be used as a means for reducing area. In return for adding a level of routing to some paths, a chain net and its duplication are eliminated. Because ChainMap makes all paths of roughly uniform routing depth, the delay of the network is dependent on the variance in logic depth. The goal is to relax paths with minimum logic depth and mask the additional routing delay with paths of high logic depth.

FIG. 5(a) shows a DFS chain tree rooted at node s. Assuming Lemma 2.15 is fulfilled, output(s)={a, $t_5$, d, g} can form an LE of {a, $t_5$}. Consequently, assuming {d, g} fulfill (i), (ii), and (iv), they still cannot form an LE because they violate (iii). Duplications occur en masse under this circumstance, along the longest network paths. Instead, if edge(s, d) and edge(s, g) are relaxed from chain to routing nets, the tree is disconnected at d and g, and at least 2 duplications of s are saved. FIG. 5(c) assumes that all nodes satisfy Lemma 2.15, except for nodes {d, g}, which violate item (iii), and $t_1$ because {c, $t_3$} form a valid LE. All are relaxed because they are not along the longest logic branch of their respective sub-trees. FIG. 5(b) shows the worst case for area, while FIG. 5(c) shows the average case ChainMap solution, with LE pairs circled in dotted lines.

An example of a heuristic relaxation technique is shallowest logic branch trimming; For all s∈N and u, v∈output(s), the longest DFS chain tree branch v and its valid LE mate u are preserved, while output(s)−{u, v} are relaxed. Longer logic chains are preserved, ultimately masking the delay of the relaxed edge(s, v). The shallowest logic branch trimming heuristic method specifically targets arithmetic designs typically containing chain tree nodes with long and short logic branches. More sophisticated relaxation techniques are presented in [10] and include a timing model to establish critical network connections, thereby implementing Least Critical Branch Trimming and Global Least Critical Relaxation.

Post-Technology Map Experimental Results

Figure 6:
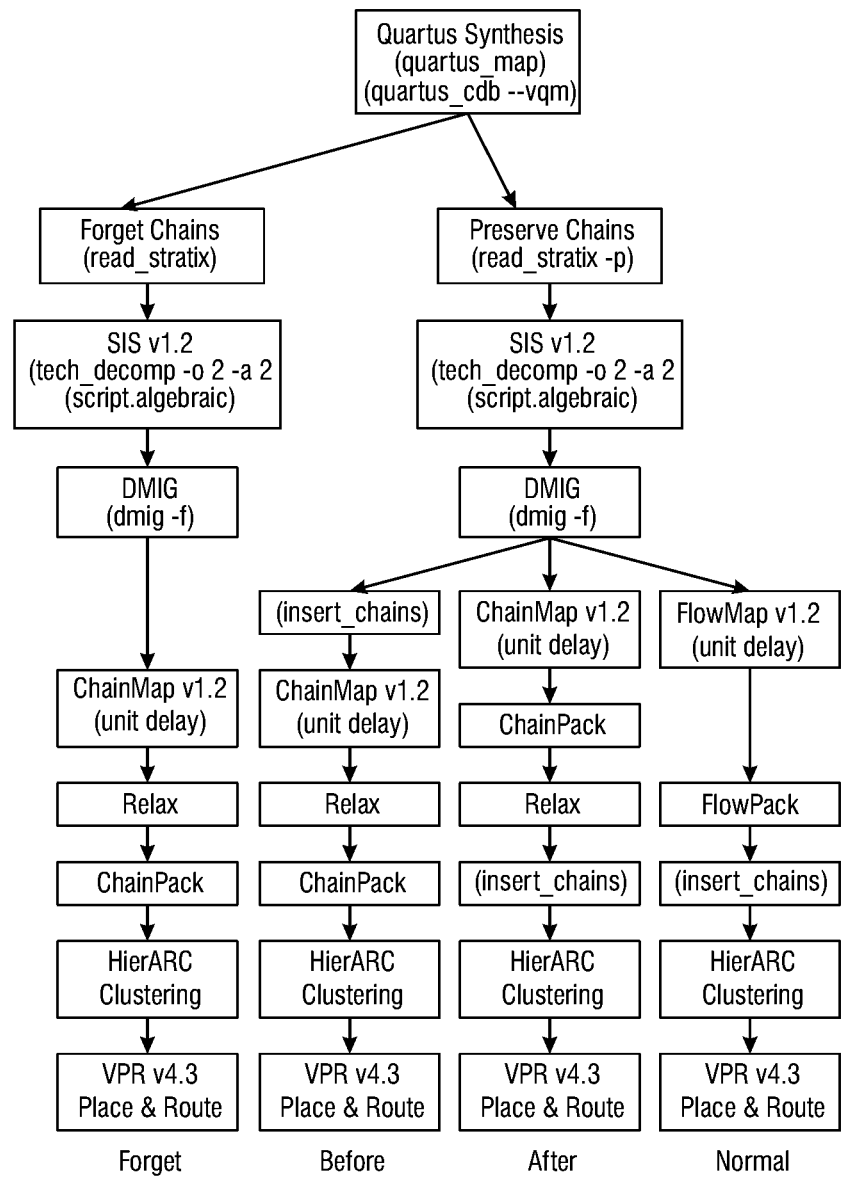
FIG. 6 illustrates experimental design flows.

To accurately assess the effectiveness of the ChainMap algorithm, it is necessary to test designs with HDL defined arithmetic carry chains. For this purpose OpenCores [7] DSP, security, and controller benchmarks have been selected with a range of arithmetic penetrance. FIG. 6 depicts the design flows, each inserting arithmetic at different points:

Forget—Arithmetic chains are optimized by synthesis and mapped with ChainMap without HDL.

Before—Arithmetic chains are preserved through synthesis, and reinserted before ChainMap.

After—Arithmetic chains are preserved through synthesis and ChainMap, and reinserted before PNR.

Normal—Arithmetic chains are preserved through synthesis and FlowMap, and reinserted before PNR.

Figure 7:
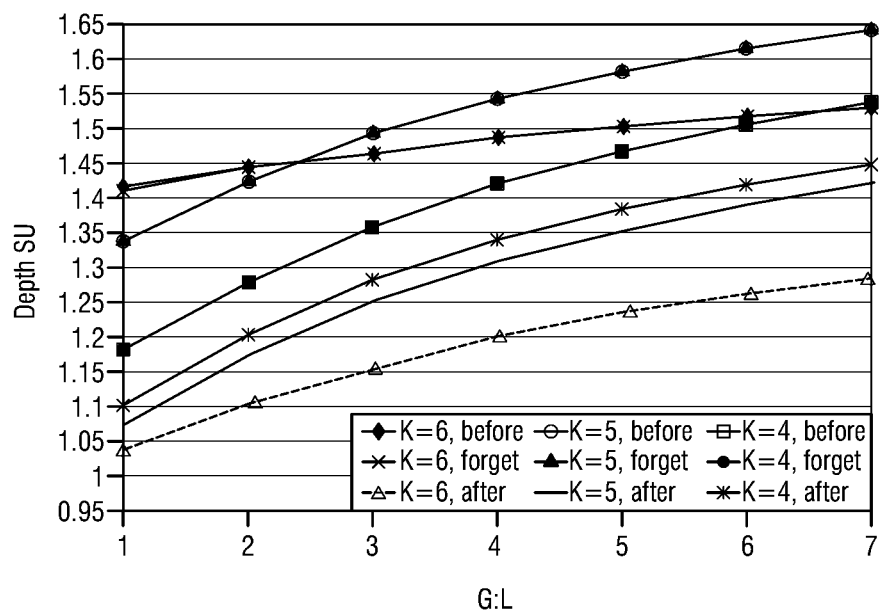
FIG. 7 is a graph illustrating speedup of flows of the present invention relative to normal flow vs. average routing to LUT delay ratio.

Quartus II has an open netlist format, VQM, and an open design flow where academic tools can be tested [6]. Because SIS lacks HDL elaboration, a parser has been created to implement a VQM netlist in SIS internal representation. An option has been included to preserve arithmetic carry chains or implement them as bit-sliced cout and sum operations. The drawback to using Quartus II for HDL interpretation is that optimization and K-LUT mapping on the netlist has been performed before importing to SIS. To mitigate this, the logic network is decomposed into 2-input AND and OR gates and resynthesized with SIS using script.algebraic. The speedup, minimum required channel width, and total routed wire length, and area (i.e. number of LUTs) results produced by the three ChainMap flows are normalized to the normal flow. Speedup values greater than 1 represent a decrease in delay. A minimum required channel width, total routed wire length, or LUT ratio of less than 1 indicate resource savings. One important contribution of this invention is that it establishes the optimal baseline of performance for logic chains. FIG. 7 shows optimal speedup averaged across all benchmarks under all three flows for K={4, 5, 6}. The independent axis is the ratio of average routing delay to static LUT delay (G:L). Since routing delay is variable, FIG. 7 shows how speedup is affected by changes in average routing delay relative to static LUT delay. Changing G:L shows how important chains become as average routing delay increases. Common G:L lies within the range of [2; 4], which for Stratix is akin to an LUT delay of 366 ps and routing delay of [732 ps, 1464 ps].

Tables 1, 2, and 3 (FIG. 8A-8C, respectively) show results for all benchmarks. They present the optimal and Least Critical Logic Branch Trimming relaxed routing ($G_o$, G) and logic ($L_o$, L) of the path with maximum routing depth and maximum logic depth, the speedup when G:L=3, the relaxed number of LUTs used, and ratio of ChainMap LUTs to normal (λ). They indicate that in all cases the optimal ChainMap solution is faster than HDL dictated chains. However, the relaxed solutions represent a mixed record of taking advantage of this potential speedup, but do consistently reduce the overall LUT utilization of a benchmark.

Benchmark results indicate optimal ChainMap performance varies with flow and LUT size, but are equal to or better than normal, as expected. Varying the value of K produces results that mirror the expected result of incorporating more logic into each LUT; as LUT size increases, speedup increases and area decreases. Across all LUTs, the before and forget flows closely minor each other, with an average difference of approximately 5%. This is a very important result, as it means that arithmetic chains can be discovered and mapped without relying on HDL macros. Although ignoring HDL macros and using ChainMap with relaxation produces solutions typically between 0.95× and 1.4× the speed of the normal case, the optimal results indicate that there is still potential performance increases to be realized.

The most heavily arithmetic design, the radix-4 FFT, yields a relaxed solution that is 1.00× speedup of normal, and an optimal solution of 1.11× (cf ft, K=5, before). This indicates that ChainMap, coupled with Least Critical Branch Trimming relaxation, produces chains at least as well as HDL macros, but that there may exist other less aggressive LUT reduction relaxation techniques. The LUT results reflect this, with the ChainMap solution 0.71× that of normal, indicating optimal performance can potentially be recouped through different relaxation techniques, or relying on the smaller design to yield shorter wires during PNR.

The phenomena of area reduction applies to nearly all designs tested and can potentially increase speedup values universally. It stems from two sources, the first being that the chain cut is a naturally more area aggressive. If a node fails to join a logic level q (d=t) because of a cut size of greater than K, ChainMap searches out an alternate K-feasible cut (d≠t). This cut is an alternative to implementing the node on a new logic level and thus each chain cut tends to incorporate more nodes. The second, and more prevalent, reason is that preserved arithmetic chains are typically 3-input gates that are not merged with others and are ultimately implemented as lone, underpopulated LUTs. ChainMap allows these underpopulated LUTs to be packed together.

Post-Place and Route Experimental Results

This invention, a generic logic chain assignment method, allows FPGA LEs to have equal access to the fast chain resources ubiquitous in today's commercial architectures. In experiments presented in [10], the same design flows espoused in FIG. 6 are combined with a more sophisticated relaxation technique, Least Critical Branch Trimming, to perform full place and route experiments. Each circuit is mapped to an FPGA with the minimum amount of component and routing resources required for implementation. LUT widths of 4, 5, and 6 inputs are tested.

Figure 9:
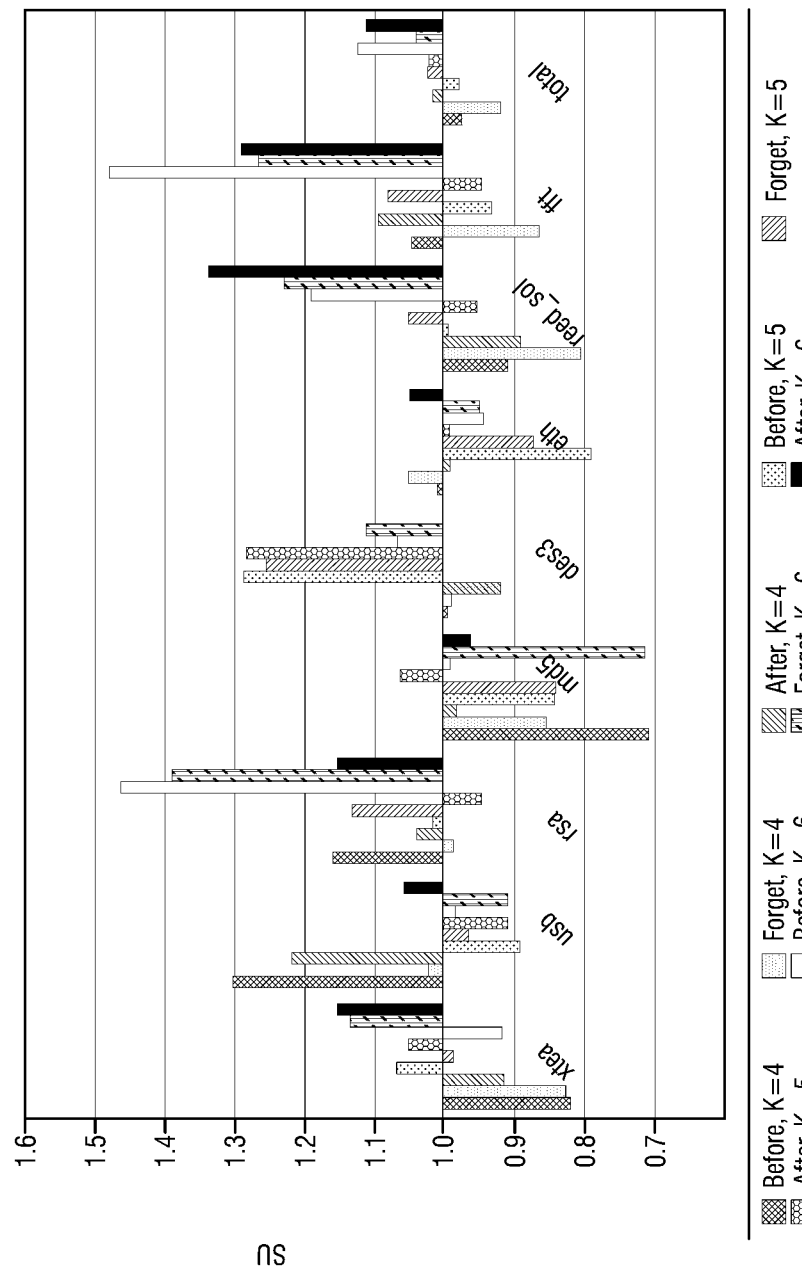
FIG. 9 is a graph illustrating speedup of ChainMap flows over normal flow for LUT of 4, 5, and 6 inputs.

The effect of this invention on the average speedup of circuits, as depicted in FIG. 9, is approximately 1.05×, with a minimum of 0.73× and maximum of 1.45× witnessed. Increasing the width of the LUT, the current trend in commercial architectures, generally yields higher performance increases for the reuse cell.

Figure 10:
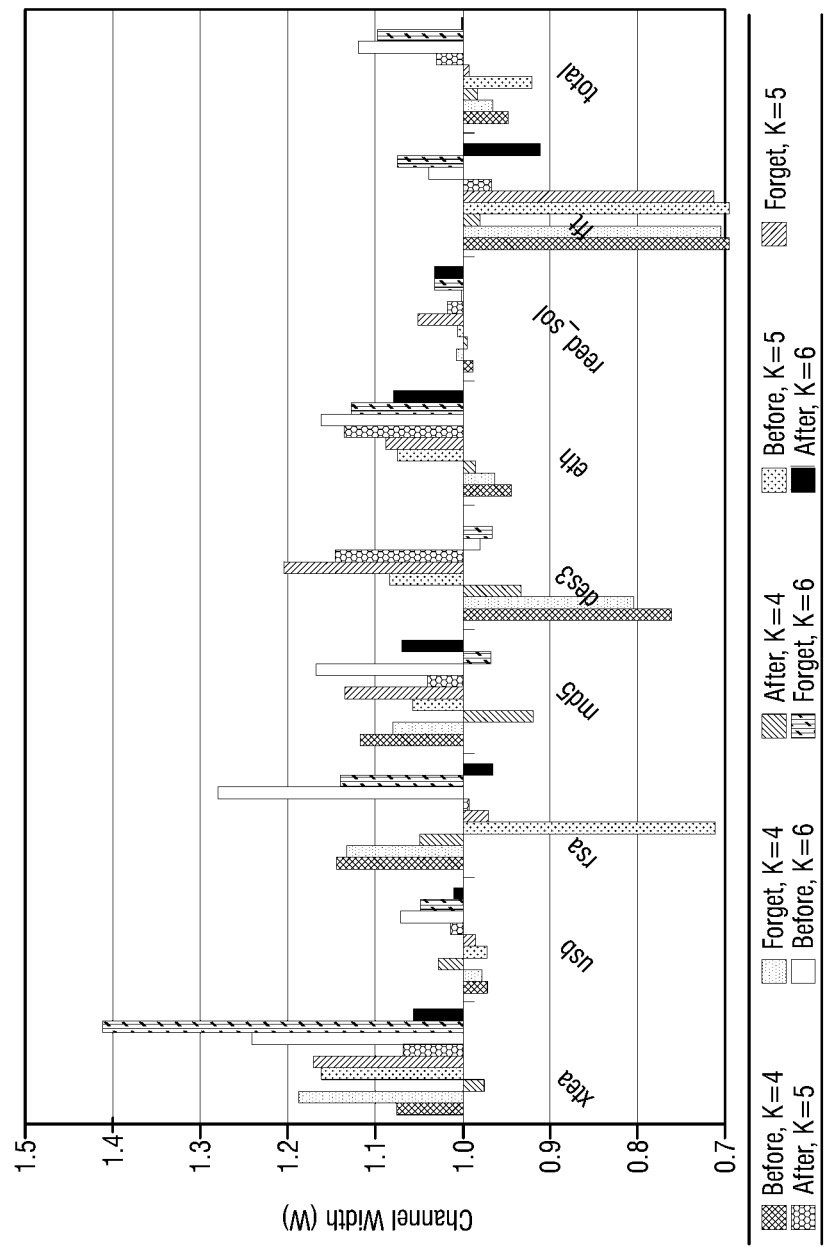
FIG. 10 is a graph illustrating required FPGA channel width of ChainMap flows over normal flow for LUT of 4, 5, and 6 inputs.

The change in channel width is defined as the ratio of the channel width of the reuse cell to that of the traditional cell; higher channel width ratio indicates a performance decrease for the reuse cell. FIG. 10 indicates that an increase in speedup for the reuse cell often comes at the cost of an increase in the FPGAs required channel width. The average change in channel width is a 1.05× increase with a minimum of 0.7× and maximum of 1.4× observed. This indicates that an increase in the routing resources of an FPGA is required if performance increases are to be reaped by the invention.

Figure 11:
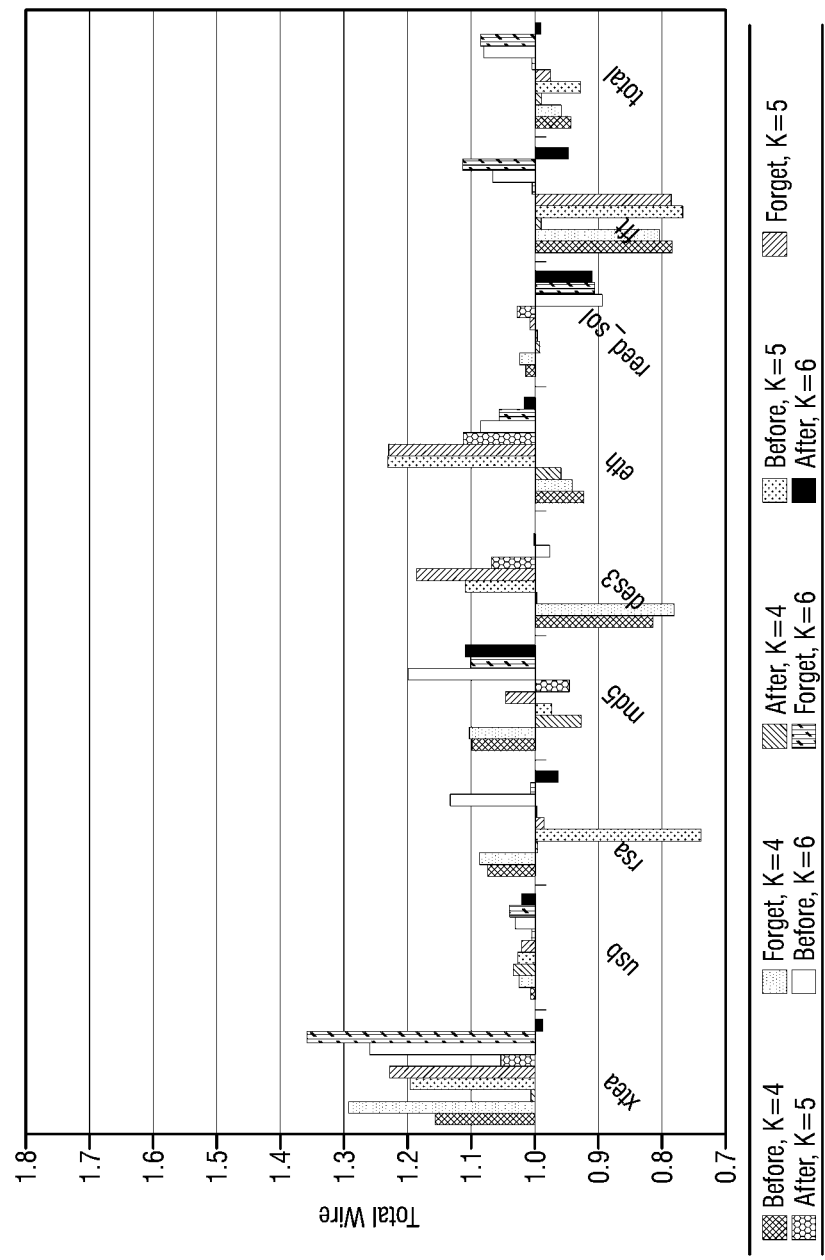
FIG. 11 is a graph illustrating total routed wire length for ChainMap flows over normal flow for LUT of 4, 5, and 6 inputs.

The change in total routed wire length is defined as the ratio of the total routed wire length of the reuse cell to that of the traditional cell; higher total routed wire length ratio indicates a performance decrease for the reuse cell. FIG. 11 indicates that an increase in speedup for the reuse cell often comes at the cost of a small increase in the FPGAs required total routed wire length. The average change in total wire is neutral, at 1.0×, with a minimum of 0.78× and maximum of 1.35× observed. This indicates that this invention more completely uses the routing resources offered by an FPGA.

CONCLUSIONS

This invention provides a polynomial time solution to the problem of identifying generic logic chains in a Boolean network. By looking at the problem of circuit depth from the perspective of minimizing routing depth, it has been shown that considerable performance gains can be realized. The important contributions of ChainMap are as follows:
1. A formal logic chain definition is presented that encompasses both arithmetic and non-arithmetic operations.
2. ChainMap creates generic logic chains in polynomial time without HDL arithmetic chain macros.
3. ChainMap ensures logic chains can be created without HDL, affording researchers an opportunity to rethink CAD algorithm and FPGA architecture design.
4. Reconfigurable fabrics with carry-select inspired elements can take advantage of ChainMap solutions.

The definition of a logic chain has been formalized as a series of nodes, such that there is a directed edge(u, v) between adjacent nodes {u, v}, that causes the logic depth of v to increase while not increasing its routing depth. This definition addresses the fact that there is a clear difference in the speed of routing versus chain nets, and guides their use.

The average post-technology map speedup of ChainMap versus a traditional mapping algorithm with HDL chains is 1.4× optimally and 1.25× relaxed, for K={4, 5, 6} and reasonable average routing delays. While all K provide performance gains, when K={5, 6}, underpopulated HDL macro LUTs can more often be packed together, yielding slightly higher average speedup and LUT savings. This result concurs with results for general networks, where K={5, 6} yield the best depth for LUT-based FPGAs [9].

Speedup, channel width ratio, and total routed wire length ratio results for post-place and route experiments indicate that circuits can benefit from this invention's inclusion in commercial FPGA flow. While some circuits often simultaneously increase performance and decrease routing consumption, others may do quite the opposite. The success of the invention depends on the characteristics exhibited by the design, such as number of arithmetic chain cells, number of cells in the design, the average fanout of each net, and, most importantly, the chain assignment algorithm chosen. Regardless, at a time when FPGA vendors are increasing the width of the LUT from 4 to 5 to 6 inputs and beyond, this invention provides a basis to support chain operations that exceed the minimal requirements of simple arithmetic chains in an efficient and minimally invasive manner. Such support combats the underutilization caused by 3-input arithmetic operations using a 6-input LUT.

Figure 2:
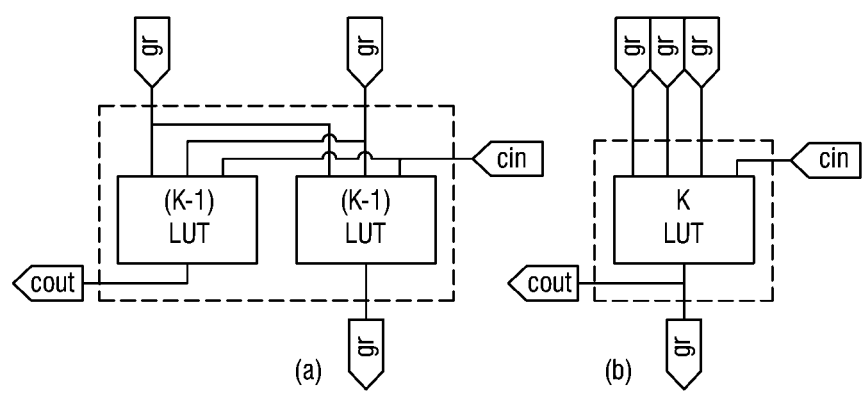
FIG. 2A illustrates a (K−1)-LUT mode.
FIG. 2B illustrates a K-LUT mode.

ChainMap requires an area/speedup trade off, an artifact of FPGAs enforcing the exclusivity constraint. However, a simple relaxation heuristic allows ChainMap to produce consistent area reductions. Area reductions of up to 0.71× are witnessed (cf ft, K=5, before) with neutral speedup, and the potential to increase speed through shorter wires. Optimal solutions, while prohibitive from an area standpoint, indicate that better relaxation techniques have the potential to yield ubiquitous speedup increases. The results presented in this work are indicative of LEs which can operate in both (K−1) and K-LUT modes, as depicted in FIG. 2, and supported by the Stratix and [5]. The ChainMap algorithm can be adapted to support pure carry-select, (K−1)-LUT chains, by searching for a (K−1)-feasible cut when d≠t, and a K-feasible cut when d=t.

The average performance difference between disregarding HDL macros completely and inserting chains before mapping is within 5%, indicating HDL preservation might potentially be abandoned. This could affect the entire FPGA design flow, allowing CAD designers to expand algorithms past the partitions created by HDL. Since the best area/speedup is usually achieved by the insertion of arithmetic chains before mapping, the inference is that they are already highly optimized in terms of literal count, and resynthesis creates sub-optimality. ChainMap demonstrates that generic logic chains perform better than solely arithmetic ones, a result that could lead to innovative FPGA architectures.

By rethinking technology mapping as an exercise in the minimization of routing depth rather than logic depth, ChainMap is able to achieve significant performance gains for all designs. Arithmetic HDL macros can be discarded in favor of allowing the CAD flow to decide when and where logic chains should be created in a Boolean network. With this approach, both FPGA hardware and software can move beyond the arithmetic constraint, and start considering all chains as having been created equal.

Therefore, a method of creating logic chains in a Boolean network of a reconfigurable fabric has been described. The present invention contemplates numerous variations, options, and alternatives. For example, the present invention contemplates variations in the structure of logical elements, variations in the methodologies used to create the logic chains, variations in the design tools used, variations in hardware of FPGAs or other reconfigurable fabrics used. These and other variations, options, and alternatives are intended to fall within the spirit and scope of the invention.

REFERENCES

Each of the references listed herein are incorporated by reference in its entirety.

[1] Altera. *Stratix Series User Guides*. www.altera.com.
[2] J. Cong and Y. Ding. FlowMap: an optimal technology mapping algorithm for delay optimization in lookup-table based FPGA designs. *IEEE Transactions on Computer-Aided Design of Integrated Circuits and Systems* 13(1):1-12, 1994.
[3] A. Farrahi and M. Sarrafzadeh. Complexity of the lookup-table minimization problem for fpga technology mapping. *IEEE Transactions On Computer-Aided Design Of Integrated Circuits And Systems*, 13(11):1319-1332, 1994.
[4] L. R. Ford and D. R. Fulkerson. *Flows in Networks*. Princeton Univ. Press, Princeton, N.J., 1962.
[5] M. Frederick and A. Somani. Non-arithmetic carry chains for reconfigurable fabrics. *In Proceedings of the 15th International Conference on Computer Design*, pages 137-143, October 2007.
[6] S. Malhotra, T. Borer, D. Singh, and S. Brown. The quartus university interface program: enabling advanced fpga research. In Proceedings of the 2004 *IEEE Int'l Conference on Field-Programmable Technology*, pages 225-230, December 2004.
[7] OpenCores. www.opencores.org.
[8] E. Sentovich, K. Singh, L. Lavagno, C. Moon, R. Murgai, A. Saldanha, H. Savoj, P. Stephan, R. K. Brayton, and A. L. Sangiovanni-Vincentelli. Sis: A system for sequential circuit synthesis. Technical Report UCB/ERL M92/41, EECS Department, University of California, Berkeley, 1992.
[9] S. Singh, J. Rose, P. Chow, and D. Lewis. The effect of logic block architecture on fpga performance. *Journal of Solid-State Circuits*, 27:281-287, March 1992.
[10] M. T. Frederick. Beyond the arithmetic constraint: depth-optimal mapping of logic chains in reconfigurable fabrics. *Iowa State University Dissertation*, May 2008.

What is claimed is:

1. A method of creating logic chains in a Boolean network representing a logic circuit and mapping the logic circuit to an electronic circuit, the method comprising:
  creating a plurality of generic logic chains in the logic circuit with each of the generic logic chains being useable for arithmetic operations or non-arithmetic operations; and
  mapping the plurality of logic chains in the logic circuit to an electronic circuit;
  wherein each of the logic chains being a subnetwork of adjacent nodes with equal routing depth and increasing logic depth.

2. The method of claim 1, wherein each of the plurality of logic chains being created in polynomial time.

3. The method of claim 1 wherein each of the plurality of logic chains being created without HDL arithmetic chain macros.

4. The method of claim 1 wherein the creating the plurality of logic chains comprises labeling.

5. The method of claim 4 wherein the labeling further comprises finding a depth increasing node.

6. The method of claim 5 wherein the labeling further comprises isolating the depth increasing node.

7. The method of claim 6 wherein the labeling further comprises finding minimum height cuts.

8. The method of claim 7 wherein the creating the plurality of logic chains further comprises mapping to generate a mapping solution using the minimum height cuts.

9. The method of claim 8 wherein the creating the plurality of logic chains further comprises applying a duplication method to implement an exclusivity constraint.

10. The method of claim 9 wherein the creating the plurality of logic chains further comprises applying a relaxation method to relax routing depth.

11. The method of claim 10 wherein the relaxation method comprises a least critical branch trimming method.

12. The method of claim 1 wherein the reconfigurable fabric is a field programmable gate array (FPGA).

13. A process of creating logic chains in a Boolean network representing a logic circuit, the logic circuit suitable for mapping to an electronic circuit, the process comprising:
  creating a plurality of generic logic chains with each of the generic logic chains being useable for arithmetic operations or non-arithmetic operations; and
  wherein each of the logic chains being a sub network of adjacent nodes with equal routing depth and increasing logic depth of the logic circuit.

14. The process of claim 13 further comprising mapping the logic circuit to the electronic circuit.

15. A method of creating logic chains in a Boolean network representing a logic circuit, the logic circuit suitable for mapping to an electronic circuit, the process comprising:
  creating a plurality of generic logic chains from adjacent cell interconnection structures with each of the generic logic chains being useable for arithmetic operations or non-arithmetic operations;
  wherein each of the logic chains being a sub network of adjacent nodes with equal routing depth and increasing logic depth of the logic circuit.

16. The method of claim 15 wherein each of the plurality of generic logic chains is associated with a depth increasing node in the logic circuit.

17. The method of claim 15 wherein the mapping is performed without preserving hardware description language (HDL) macros.

* * * * *